US011967300B2

(12) United States Patent
Glaser, II

(10) Patent No.: US 11,967,300 B2
(45) Date of Patent: Apr. 23, 2024

(54) MUSICAL INSTRUMENT PITCH CHANGER SYSTEM AND RELATED METHODS

(71) Applicant: Joseph Glaser, II, Nashville, TN (US)

(72) Inventor: Joseph Glaser, II, Nashville, TN (US)

(*) Notice: Subject to any disclaimer, the term of this patent is extended or adjusted under 35 U.S.C. 154(b) by 0 days.

(21) Appl. No.: 18/084,732

(22) Filed: Dec. 20, 2022

(65) Prior Publication Data

US 2023/0129633 A1 Apr. 27, 2023

Related U.S. Application Data

(63) Continuation of application No. 17/505,121, filed on Oct. 19, 2021, now Pat. No. 11,532,291, which is a continuation of application No. 17/023,634, filed on Sep. 17, 2020, now Pat. No. 11,151,969, and a continuation of application No. 16/662,015, filed on Oct. 23, 2019, now Pat. No. 10,810,977.

(60) Provisional application No. 62/749,644, filed on Oct. 23, 2018.

(51) Int. Cl.

| | |
|---|---|
| ***G10D 3/147*** | (2020.01) |
| ***G10D 1/08*** | (2006.01) |
| ***G10D 3/04*** | (2020.01) |
| ***G10D 3/06*** | (2020.01) |

(52) U.S. Cl.

CPC ............. *G10D 3/147* (2020.02); *G10D 1/085* (2013.01); *G10D 3/04* (2013.01); *G10D 3/06* (2013.01)

(58) Field of Classification Search

CPC .......... G10D 3/147; G10D 1/085; G10D 3/04; G10D 3/06

See application file for complete search history.

(56) References Cited

U.S. PATENT DOCUMENTS

| | | | | |
|---|---|---|---|---|
| 4,354,417 | A * | 10/1982 | Glaser, II | G10D 3/147 984/120 |
| 11,532,291 | B2 * | 12/2022 | Glaser, II | G10D 3/04 |
| 2006/0185494 | A1 * | 8/2006 | Zumsteg | G10D 3/147 84/312 P |
| 2014/0196590 | A1 * | 7/2014 | Glaser, II | G10D 3/00 84/453 |
| 2016/0351174 | A1 * | 12/2016 | Glaser, II | G10D 3/04 |
| 2019/0362695 | A1 * | 11/2019 | Glaser, II | G10D 3/04 |
| 2020/0126521 | A1 * | 4/2020 | Glaser | G10D 1/085 |
| 2021/0125588 | A1 * | 4/2021 | Glaser | G10D 3/06 |
| 2021/0264885 | A1 * | 8/2021 | Black | G10D 3/04 |
| 2022/0084486 | A1 * | 3/2022 | Glaser, II | G10D 3/147 |
| 2022/0223124 | A1 * | 7/2022 | Dlugasz | G10D 1/08 |
| 2023/0129633 | A1 * | 4/2023 | Glaser, II | G10D 3/04 84/291 |

* cited by examiner

*Primary Examiner* — Robert W Horn

(74) *Attorney, Agent, or Firm* — Jonathan Spangler, Esq.

(57) ABSTRACT

A pitch changer system for a string musical instrument, including a lever assembly, a rotating saddle assembly, a swing plate, and a lever tensioning assembly. Applying force to move the lever in a first direction forces a bell crank matingly coupled to the lever into rotation such that a coupling system of the lever tensioning assembly causes the swing plate to force a rotating saddle of the rotating saddle assembly into rotation to elongate and thereby temporarily change the pitch of a string coupled to the rotating saddle.

20 Claims, 43 Drawing Sheets

Swing Plate 26

MUSICAL INSTRUMENT PITCH CHANGER SYSTEM AND RELATED METHODS

CROSS-REFERENCE TO RELATED APPLICATIONS

This application is a continuation application of U.S. application Ser. No. 17/505,121 filed Oct. 19, 2021 (now U.S. Pat. No. 11,532,291), which is a continuation application of U.S. application Ser. No. 17/023,634 filed Sep. 17, 2020 (now U.S. Pat. No. 11,151,969), which is a continuation application of U.S. application Ser. No. 16/662,015 filed Oct. 23, 2019 now U.S. Pat. No. 10,810,977), which claims the benefit under 35 U.S.C. § 119(e) of U.S. Patent Application No. 62/749,644 entitled "MUSICAL INSTRUMENT PITCH CHANGER SYSTEM AND RELATED METHODS", filed Oct. 23, 2018, which is incorporated herein by reference in its entirety.

BACKGROUND OF THE INVENTION

I. Field of the Invention

The present invention relates generally to stringed musical instruments and, more particularly, to a pitch changer system for use with stringed musical instruments with various improvements over the prior art.

II. Discussion of the Prior Art

On a stringed instrument, it is often an object of the player to change the pitch of a played note while it is vibrating. This may be done by moving a finger, metal bar or other object along the string on the fingerboard to shorten or lengthen the vibrating string length to change its pitch or by bending the string across the fingerboard to increase the tension and thus raise the pitch of the string. A vibrating string's pitch can also be raised or lowered with a mechanical device to which one end of the string is attached. This mechanism may be linked to a lever or foot pedal that can be operated by a finger, palm, foot, knee, elbow, wrist etc. Such a lever can also be the attachment point for the instrument strap, which typically crosses the player's shoulder and suspends the instrument. This strap-attached and activated pitch bending device is often used on, but not limited to, guitars and guitar family instruments.

Conventionally, a guitar strap activated pitch bending device employs a player's downward pressure with the hand that is on the neck or body to move a lever at one or both connection points of the main strap or of an auxiliary strap. These devices have been in use since 1920 and common styles and multiple preferences have developed around the use of pitch bending devices. In particular, there is not a singular preference of which string or strings within a tuning are desired to be pitch bent, but typically on a guitar tuned to the standard tuning, the second and third highest pitched strings ("B" and/or "G" strings are the focus of prior art string-bending efforts. (See U.S. Pat. No. 4,354,417 to Glaser and U.S. Pat. No. 9,412,346 to Glaser et al.) The typical strap activated string bending mechanism consists of a strap attachment lever connected to a bell crank which is further connected by linkage to a lever or pivot in or near the bridge saddle to which one end of the string is attached. Further, there is often a spring connected to that linkage to resist the player's pitch-bending effort and also support the partial weight of the instrument as exerted at the strap end. Most commonly, a single string activating mechanism is employed without the ability for the player to easily Choose between the "B" or "G" strings without prior commitment to one configuration or the other or further modification to the instrument.

Although representing certain advancements at the time, the prior art pitch changer systems for stringed instruments suffer a variety of drawbacks. The present invention is directed at overcoming these drawbacks through a host of improvements. For example, prior art pitch changer systems are not easily swappable between strings (e.g. between "B" and "G" strings or vice versa). Moreover, many prior art pitch changer systems have been used on electric guitars with so-called "bolt-on necks" (necks bolted to neck plate mounted on body), wherein the prior art strap-activated pitch changer systems are installed through the neck plate which can weaken the instrument's neck-to-body mounting. Other prior art string bending systems require considerable modification to the instrument (See U.S. Pat. No. 5,481,954 to Parsons), or present complications in neck removal for repair and/or replacement, are bulky, and/or unstable and thus subject to becoming loose and becoming inaccurate/off-pitch during use. For example, due to the necessity to having a strap attachment lever that activates the mechanism by being securely connected to an interior bell crank through the neck plate, attaching that lever to that bell crank has typically been done with exterior screws or bolts and these have been subject to constant loosening during use.

The present invention is directed at overcoming, or at least reducing, the problems of the prior art pitch changing systems.

SUMMARY OF THE INVENTION

The present invention overcomes the disadvantages of the prior art in a variety of manners, including but not limited to the following. The pitch changer system disclosed herein improves the stability and long term security of the strap attachment and activation arm through the neck plate by assembling the lever and bell crank as corresponding half shafts securely combined by two circular bearings or bushings that are mounted in the neck plate assembly, which also serves to optimize the smooth rotation of the lever arm and bell crank assembly. The pitch changer system disclosed herein provides flexibility of choice (selection of strings to be temporarily attenuated) by providing a movable or reversible bridge saddle that, with the stings temporarily released, may be relocated and/or inverted to allow the activation of the "G" string instead of the "B" string or vice versa. Moreover, the pitch changer disclosed herein provides a string attachment point on a rotating saddle that includes an elongated extension member dimensioned to contact a swing plate in either position (G or B) without separate connection points or separate return springs. This makes such a device convenient for a player or technician to change the selected string to be activated rather than requiring an entirely separate or second instrument to achieve this selection.

The pitch changer system of the present invention also significantly reduces the invasive nature of the mechanism on the guitar by combining the mechanism into the structure of the neck plate itself so that the force exerted by the player on the pull lever (and the internal mechanism) is supported by the entirety of the neck plate and its mounting screws. Further, the disclosed pitch changer system securely mounts the mechanism housing to the neck plate, which allows the lever and mechanism to have improved structural integrity over prior art systems. Additionally, the pitch changer system disclosed herein includes an entirely self-contained neck plate mechanism, which greatly simplifies and reduces the time required for installation and any service. The disclosed pitch changer system also boasts a mechanism consisting of a lever axle of two half shafts held together by two bearings, which allows the assembly of the exterior strap activated pull lever arm and the interior bell crank to be installed through and on both sides on the neck plate with a minimum opening in the neck plate. This significantly reduces the chance that dirt or other contaminants can enter the mechanism and increases the structural integrity of the neck mounting plate.

The pitch changer system disclosed herein may include a variety of additional features and/or design modifications. For example, in addition to pitch changing via strap-enabled lever actuation (to string bend when the player pushes the guitar down or away from his/her body), it is also contemplated that a cable or other element may be employed to allow the player to note-bend by pulling up on the guitar (vs. pushing down on the guitar as described above). The pitch-changing may be tunable or adjustable via the use of a stop that limits the travel of the lever arm to achieve a predetermined, preferred pitch change. Such a tuner is commonly an adjustable stop that limits the travel of the bell crank (coupled to the lever arm via rod and/or cable to another lever) and the string anchoring finger (mounted within the instrument bridge to which the instrument string is also anchored). The rotation of this string anchoring finger stretches and/or releases said string by an adjustable increment which causes the desired pitch bend. Commonly, a spring or other resistive means is also connected to the bottom of the string finger and may extend further through the inst body to an accessible screw seated in a bushing, ferrule or on a plate where the resistive tension can be adjusted.

The lever of the disclosed pitch changer is securely and rigidly connected to the axis on which it rotates. It securely shares this axis with the bell crank, which advantageously pulls the linkage connecting to the bridge saddle to affect the string length and note pitch. The pitch changer of the present invention, accomplishes this by constructing the strap lever arm and the bell crank each as unitary pieces machined with, welded to or otherwise permanently connected to opposite halves of the axis shaft that extends through the mounting plate. In use, these two halves of the axis shaft are assembled and held rigidly as one axis shaft by an upper and lower bearing or low friction bushing. These bearings/or bushings are firmly seated in a bearing block chassis that is constructed as a unitary fabrication of the mounting plate or, alternatively, this chassis is screwed, soldered, glued or welded to said neck plate. This bearing block and cover plate can also contain the adjustable tuner stop against which the bell crank will stop its rotation and that of the strap lever. Because the two axis shaft halves are banded together by bearings or bushings, and the bearings or bushings are firmly seated in the chassis, the strap lever and bell crank can be assembled through a cover plate with an opening minimally larger than the axis shaft. Further, because the strap lever arm and bell crank are held together by one or more bearings or bushings and said bearings or bushing are rigidly retained in the bearing block, this assembly will then act as one unitary piece and will not be subject to loosening when subject to the stresses of constant use, impact or vibration. Further, the main lever am is connected to the axis and bell crank without the use of any screw or bolt subject to coming loose or having its threads or head stripping through repeated tightening. This assembly of strap lever, axis shaft, bell crank, bearings, chassis, tuner stop and cover plate is thus an integrated unit that can be dropped whole into a cavity in the instrument body for installation simplicity, economic advantage and durability.

The pitch changer system disclosed herein enables the ability to quickly and easily switch between strings for pitch bending. For example, musicians who employ this mechanism and its mechanically enabled pitch bending style commonly select the “B” string or “G” string or both for pitch bending. Typically musicians use one string or the other and less frequently both. Heretofore, it has been complicated or impossible for the player to select which string to apply strap activated string bending. With the pitch changer of the present invention, a player may simply and quickly loosen the strings and invert the bridge saddle, which is symmetrical top to bottom, and thus convert a “B” mechanism into a “G” mechanism. The string length tuning compensation or intonation offset is also designed to similarly reverse itself to accommodate the difference of string length between a “F” and “B” string saddle and a “G” and “D” string saddle as adjusted for typical electric guitar string sets.

The pitch changer system of the present invention also includes a swing plate which is attached using a hinge between the bridge plate and instrument top surface and below and behind the finger to act as a pull distribution mechanism for either position in which the finger may be placed. This swing plate allows quick and simple alternating of position of the selected string mechanism and, in addition, may be articulated to permit the “G” string finger (if selected) to contact the swing plate with an offset comparable to the longer string length intonation offset of a typical “G” string saddle.

The pitch changer of the present invention also boasts a number of features and advantages. The lever assembly has a unitary pre-assembled drop-in design to quickly and easily be installed on the neck of the guitar by substituting it for the factory neck plate. The lever assembly includes a bearing housing extending from the lower surface of the mounting plate which houses a pair of bearing assemblies (upper and lower) which hold together the two halves of the split crank shaft (half-shaft of lever mating with half-shaft of the bell crank) to allow the lever arm and the bell crank to be assembled through an essentially shaft sized hole in the mounting plate while acting as one strong unitary piece not subject to loosening. The bell crank includes an arm extending from the half-shaft, which includes multiple attachment points for coupling with a cable forming part of the lever tensioning system (e.g. spring, spring tension adjuster, and cable) to provide multiple rotational ranges of the lever (e.g. three attachment points for low, medium, and large rotational ranges of the lever). The tuner thumbscrew and bell crank stop are self-contained.

The rotating saddle assembly includes a static saddle and a rotating saddle, which may be reversed relative to the saddle mounting plate to change the string pitch changing capability from a first string (e.g. B string on a guitar) to a second string (e.g. G string on a guitar) and vice versa. The rotating saddle assembly includes reversing asymmetrical string length compensation by providing the static saddle with an first surface that defines a first string length when in a first orientation (e.g. when the rotating saddle is over a first slot) and a second surface (opposite from the first surface) that defines a second string length when in a second orientation (e.g. when the rotating saddle is over a second slot adjacent to the first slot). By combining the static saddle and the rotating saddle on one assembly, the string force of the static saddle helps create contact between the height adjustment screw of the rotating saddle and the bridge mounting plate. A single screw is used for string length compensation adjustment to allow simultaneous adjustment of both static saddle and the rotating saddle. The string length compensation adjustment screw hole also includes an offset angle to compensate for asymmetrical string force on the combination of the static saddle and the rotating saddle.

The swing plate has a width that enables it to be used in either pitch-changing configuration, for example, for G-string pitch changing or B-string pitch changing. The swing plate has a built-in offset to retain the standard rotational alignment of the rotating saddle when used in the "G" string position where a longer string length compensation is typical.

According to one aspect, a pitch changer system is provided for a string musical instrument having a body and a neck. The pitch changer system includes a lever assembly, a rotating saddle assembly, a swing plate, and a lever tensioning system. The lever assembly includes a mounting plate configured to be mounted to the body of the stringed musical instrument, a lever having a first section extending through the mounting plate in mating engagement with a first section of a bell crank and a second section configured to be moved directly or indirectly by a user to effectuate a pitch change of a string on the stringed musical instrument, a pair of bearing assemblies dimensioned to receive and enable rotational movement of the first sections of the lever and bell crank while in mating engagement, and a rotation adjustment assembly to selectively adjust a rotational range of the second section of the lever and a second section of the bell crank. The rotating saddle assembly is configured to be mounted to a bridge mounting plate on the body of the stringed musical instrument including a plurality of strings holes and at least a first slot and a second slot, the rotating saddle assembly including a static saddle and a rotating saddle with an elongated member extending therefrom, the rotating saddle assembly configured to be coupled to the mounting plate such that the rotating saddle member extends through one of the first and second slots. The swing plate is configured to extend into a swing plate recess formed in the body of the stringed musical instrument, the swing plate including an aperture, a first contact region configured to contact the elongated member of the rotating saddle when the rotating saddle is configured to extend through the first slot in the mounting plate of the saddle assembly, and a second contact region configured to contact the elongated member of the rotating saddle when the rotating saddle is configured to extend through the second slot in the mounting plate of the saddle assembly, The lever tensioning system is configured to be mounted to the body of the stringed musical instrument, the lever tensioning system including a spring, a spring tension adjuster, and a coupling system configured to couple the spring to the swing plate and the second section of the bell crank, wherein applying force to move the second section of the lever in a first direction forces the bell crank into rotation such that the coupling system causes the swing plate to force the elongated member of the rotating saddle into rotation to elongate and thereby temporarily change the pitch of a string coupled to the rotating saddle.

In other aspects, the lever assembly may include a bearing housing extending from a lower surface of the mounting plate configured to receive the pair of bearing assemblies. The bearing housing may be integrally formed with the mounting plate of the lever assembly. The pair of bearing assemblies may comprise upper bearing assembly and a lower bearing assembly each having an inner race and an outer race, wherein the outer race of the upper bearing assembly is held within the bearing housing via a screw disposed within a threaded aperture in a wall defining part of the bearing housing with a screw head section that extends over a portion of the outer race of the upper bearing assembly. The inner race may be held within the bearing housing via a screw disposed within a threaded aperture in the first section of the lever with a screw head section that extends over a portion of the inner race of the upper bearing assembly.

In other aspects, the rotation adjustment assembly of the lever assembly may include a thumbwheel having a portion that extends through a slot formed in the mounting plate, an elongated member extending perpendicularly from the thumbwheel, and a translating block configured to interact with the elongated member to selectively move the translating block in a first direction and second direction. The elongated member extending from the thumbwheel may include a threaded section configured to move the translating block in the first or second direction depending upon the selective rotation of the threaded section within a threaded aperture formed in the translating block via the thumbwheel. The elongated member extending from the thumbwheel may include an unthreaded section adjacent to the thumbwheel configured to be restrained within a wall section defining part of the bearing housing. The unthreaded section of the elongated member may be positioned within a threaded recess formed in the wall defining the bearing housing and restrained therein via a screw disposed in the threaded recess. The rotation adjustment assembly may include a fixed tuning stop and a movable tuning stop that collectively define the rotational range of the second section of the bell crank and thereby the second section of the lever, wherein the fixed tuning stop and moveable tuning stop are each of non-metallic construction. The fixed tuning stop may be positioned in a fixed location on a portion of the mounting plate of the lever assembly and the movable tuning stop may be positioned on a translating block forming part of the rotation adjustment assembly of the lever assembly.

In other aspects, the first section of the lever may include at least one surface that mates with at least one surface of the first section of the bell crank to accomplish the mating engagement between the first sections of the lever and bell crank. The at least one surface of the first section of the lever may be part of a half-cylinder formed on the first section of the lever and wherein the at least one surface of the first section of the bell crank may be part of a half-cylinder formed on the first section of the bell crank.

In other aspects, the position of the rotating saddle and the static saddle may be reversed relative to the mounting plate of the saddle assembly to change the string to be pitch-changed. The static saddle may include a first static saddle region and a second static saddle region, wherein the first static saddle region is disposed on a first surface of the rotating saddle assembly to define a first string intonation location, and the second static saddle region is disposed on a second surface of the rotating saddle assembly opposite the first surface to define a second string intonation location different than the first string intonation location. The first string intonation location is to intonate a G-string on a guitar and the second string intonation is to intonate a B-string on a guitar, wherein reversal of the rotating saddle assembly provides automatic string length compensation by: a) positioning the first string intonation location on the first surface of the rotating saddle assembly for engagement with the G-string on a guitar when the rotating saddle member is coupled for temporary pitch changing on the B-string of the guitar; and b) positioning the second string intonation location on the second surface of the rotating saddle assembly for engagement with the B-string on a guitar when the rotating saddle member is coupled for temporary pitch changing on the G-string of the guitar.

The rotating saddle assembly may include a saddle block with a slot configured to receive the rotating saddle, a pair of first co-aligned apertures formed on either side of the slot, a pair of second co-aligned apertures formed on either side of the slot adjacent to the pair of first co-aligned apertures, and a pin configured to be selectively positioned within the first pair of co-aligned apertures or the second pair of co-aligned apertures and a rotation aperture formed in the rotating saddle to rotatably mount the rotating saddle in a first position defined by the first pair of co-aligned apertures or a second position defined by the second pair of co-aligned apertures.

According to another aspect, the first slot in the mounting plate of the saddle assembly may be adjacent to the string hole for a G string on a guitar and the second slot in the mounting plate of the saddle assembly may be adjacent to the string hole for a B string on a guitar.

In other aspects, the aperture of the swing plate may be a slot dimensioned to restrain a portion of the coupling system of the lever tensioning system to prevent rotation of the spring when the spring tension adjuster is being operated to adjust the tension of the spring. The swing plate is comprised of at least one of plastic and metal. The swing plate may include a hinge base located at least one of within and on top of the body.

In other aspects, the coupling system of the lever tensioning assembly may include an elongated cable having a first loop at a first end, a second loop at a second end, and a length therebetween, the first loop coupled to the spring, and the second loop coupled to the second section of the bell crank. The second loop of the elongated cable may be coupled to the bell crank by screwing a screw into a threaded aperture in the second section of the bell crank. The lever tensioning assembly is disposed within at least one bore created within the body. The spring tension adjuster may include a threaded bushing configured to be installed within a recess formed in the body, an elongate threaded member configured to be threadably engaged within the threaded bushing, and a coupler for coupling the elongate threaded member to the spring.

In other aspects, a method is provided for equipping a string musical instrument having a body and a neck with a pitch changer system, comprising the steps of: 1) creating a lever assembly bore in the body of the stringed musical instrument dimensioned to receive components of a lever assembly positioned under a mounting plate of the lever assembly when the lever assembly is mounted to the string musical instrument; 2) creating a swing plate bore in the body of the stringed musical instrument dimensioned to receive a swing plate to be positioned under a bridge mounting plate when mounted to the string musical instrument; 3) creating a lever tensioning system bore in the body of the stringed musical instrument dimensioned to receive a lever tensioning system to be coupled to the swing plate and lever assembly when mounted to the string musical instrument; 4) creating at least a first slot and a second slot in a bridge mounting plate of the stringed musical instrument, wherein the first slot and second slot are each dimensioned to receive a rotating saddle and are located adjacent to string holes formed in the bridge mounting plate dimensioned to receive strings; 5) installing a lever assembly on the stringed musical instrument proximate the lever assembly bore, wherein the lever assembly includes a mounting plate disposed over the lever assembly bore, a lever having a first section extending through the mounting plate in mating engagement with a first section of a bell crank and a second section configured to be moved directly or indirectly by a user to effectuate a pitch change of a string on the stringed musical instrument, a pair of bearing assemblies dimensioned to receive and enable rotational movement of the first sections of the lever and bell crank while in mating engagement, and a rotation adjustment assembly to selectively adjust a rotational range of the second section of the lever and a second section of the bell crank; 6) installing a rotating saddle assembly to the bridge mounting plate, wherein the rotating saddle assembly includes a static saddle and a rotating saddle with an elongated member extending therefrom, such that the rotating saddle member extends through one of the first and second slots; 7) installing a swing plate within the swing plate bore, wherein the swing plate includes an aperture, a first contact region configured to contact the elongated member of the rotating saddle when the rotating saddle is configured to extend through the first slot in the mounting plate of the saddle assembly, and a second contact region configured to contact the elongated member of the rotating saddle when the rotating saddle is configured to extend through the second slot in the mounting plate of the saddle assembly; and 8) installing a lever tensioning system within the lever tensioning system bore, wherein the lever tensioning system includes a spring, a spring tension adjuster, and a coupling system configured to couple the spring to the swing plate and the second section of the bell crank such that, during use, an application of force to the second section of the lever in a first direction forces the bell crank into rotation such that the coupling system causes the swing plate to force the elongated member of the rotating saddle into rotation to elongate and thereby temporarily change the pitch of a string coupled to the rotating saddle.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein.

DETAILED DESCRIPTION illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The pitch changer system disclosed herein boasts a variety of inventive features and components that warrant patent protection, both individually and in combination.

Figure 1:
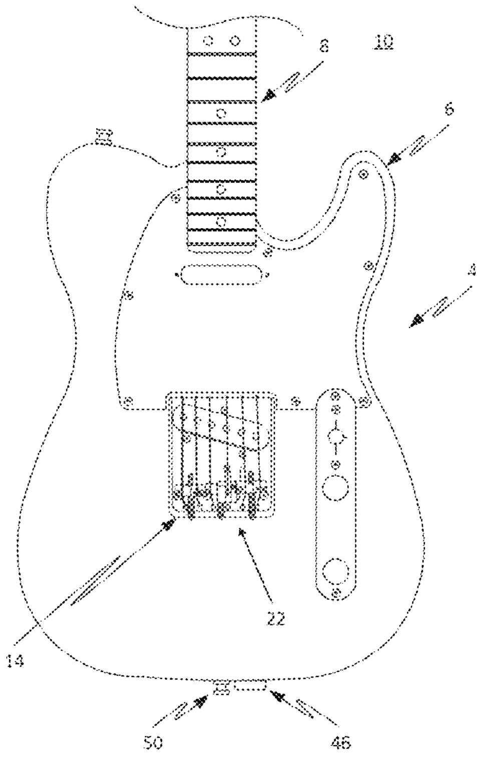
FIGS. 1-2 are front and back views, respectively, of an electric guitar equipped with a bridge assembly and a lever assembly of a pitch changer system according to one aspect of the present invention.
Figure 2:
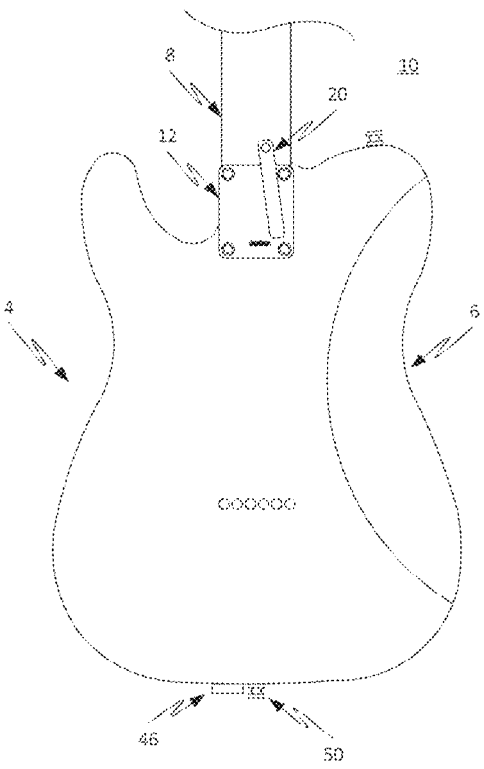
Figure 3:
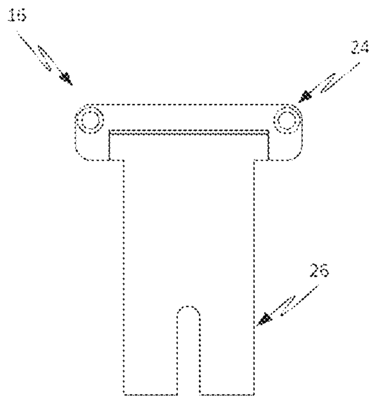
FIG. 3 is a front view of a swing plate assembly forming part of the pitch changer system according to one aspect of the present invention.
Figure 4:
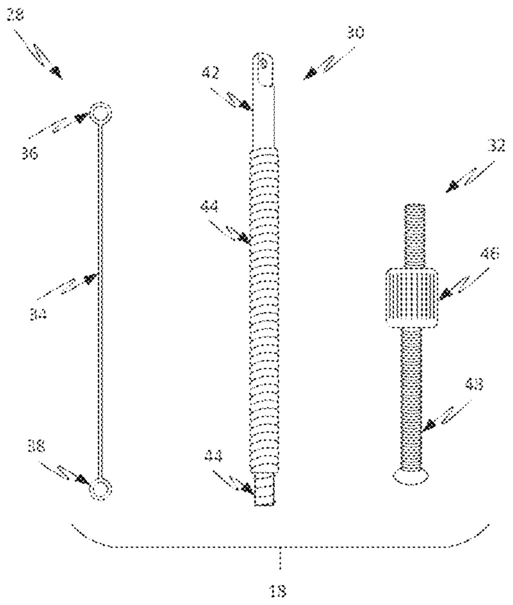
FIG. 4 is a side view of a lever tensioning assembly forming part of the pitch changer system according to one aspect of the present invention.

FIGS. 1-4 show a pitch changer system 10 of the present invention installed for use on a stringed instrument which, by way of example only, is an electric guitar 4 consisting of a body 6 and neck 8 as shown in FIGS. 1-2. It will be appreciated that the pitch changer system 10 may be employed with any of a variety of stringed musical instruments beyond an electric guitar (much less the type of electric guitar shown) without departing from the scope of the present invention. The pitch changer system 10 includes a lever assembly 12 mounted to the back of the body 6 at the junction with the neck 8 (FIG. 2), a bridge/saddle assembly 14 mounted to the bridge area on the front of the body 6 (FIG. 1), as well as a swing plate assembly 16 (FIG. 3) and lever tensioning system 18 (FIG. 4). While each assembly forming the pitch changer system 10 will be described in detail below, a preliminary explanation follows.

Figure 5:
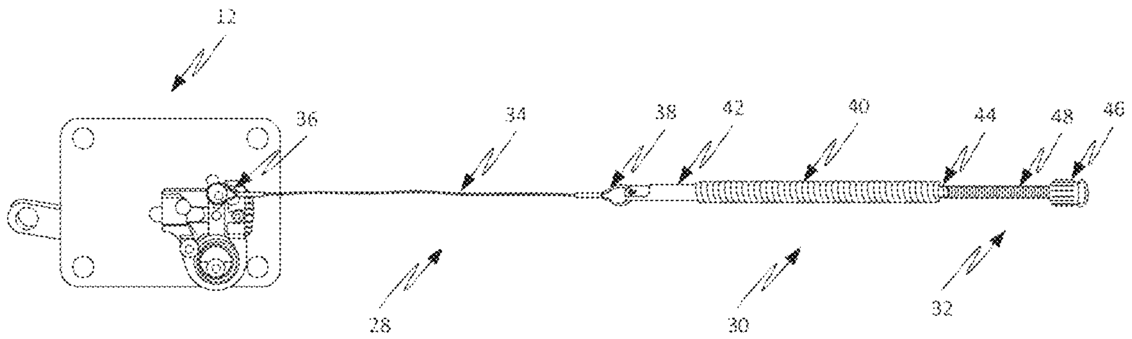
FIG. 5 is a side view of a lever assembly coupled to a lever tensioning assembly of the pitch changer system according to aspects of the present invention.

The lever assembly 12 (FIG. 2) is designed to transfer rotational mechanical force exerted on a lever 20 via a guitar strap (not shown) to an internally disposed bell crank (as will be described in detail below with reference to FIGS. 8-16), The bridge/saddle assembly 14 (FIG. 1) includes a rotating saddle assembly 22 (as will described in detail below with reference to FIGS. 17-20) designed to cooperate with the swing plate assembly 16 of FIG. 3 to change the pitch of a select string upon rotation of the swing plate assembly 16 according to the present invention. The swing plate assembly 16 (FIG. 3) is mounted under the bridge/saddle assembly 14 and includes a hinge base 24 hingedly coupled to a swing plat 26 designed to physically rotate the rotating saddle assembly 22 of FIG. 2 when the lever tensioning system 18 of FIG. 4 is moved in response to the rotation of the lever 20 of the lever assembly 12 (as will be described in detail below with reference to FIGS. 21-23). As showing 4, the lever tensioning system 18 includes a cable assembly 28, a spring assembly 30, and a spring adjustment assembly 32. The cable assembly 28 includes a cable 34 with an upper loop 36 and a lower loop 38. The spring assembly 30 includes a spring 40, an upper coupler 42, and a lower coupler 44. The spring adjustment assembly 32 includes a flanged bushing 46 and an adjustment screw 48. When installed, the upper loop 36 of the cable assembly 28 is coupled to the bell crank (not shown) of the lever assembly 12, the lower loop 38 is coupled to the upper coupler 42 of the spring assembly 30, and the lower coupler 44 has an internal threaded lumen that threadedly receives the adjustment screw 48 such that, upon clockwise rotation, the lower coupler 44 advances towards the bushing 46 to increase the tension exerted by the spring 40 on the lever 22 of the lever assembly 12 (and vice versa via counter-clockwise rotation). FIG. 5 illustrates the lever assembly 12 coupled to the lever tensioning assembly 18 according to an aspect of the present invention.

In use, the guitar 4 will be equipped with a guitar strap (not shown) having a first end coupled to a first strap button 50 on the end of the body 6, a second end coupled to the end of the lever 20 of the lever assembly 12, and a strap section extending therebetween positioned diagonally over the back and left shoulder of the player for the right-handed guitar 4 shown in FIGS. 1-2 (reverse for left-handed guitars). Collectively, the components of the pitch changer system 10 allow a player of the guitar 4 to change the pitch of a selected string by moving the guitar 4 (e.g. tipping the neck 8 downward while playing) such that the guitar strap will force the lever 22 into clockwise rotation. This rotational force increases the length of the selected string during such lever rotation to effectuate a desired pitch change. When the rotational force is removed (e.g. the neck 8 is tipped back up while playing), the lever 22 rotates counter-clockwise under spring tension of the lever tensioning system 18 to return to a starting position, during which rotation the string length decreases to bring the selected string back to its index or normal pitch. By way of example only, the selected string may be the G string and the pitch changer system 10 may be employed to temporarily change the pitch to G#, A or A# or to another desired increment. As will be described below, the pitch changer system 10 may also be used with any number of other guitar strings, including but not limited to the B string in order to temporarily change the pitch to C, C# or D or to another desired increment. Moreover, although described above in use with a guitar strap, it will be appreciated that the pitch changer system 10 of the present invention may actuated with any strap, cord, band or other means anchored or wrapped about the player's shoulder, waist, foot or other stationary part that may be used to exert resistive force.

Figure 6:
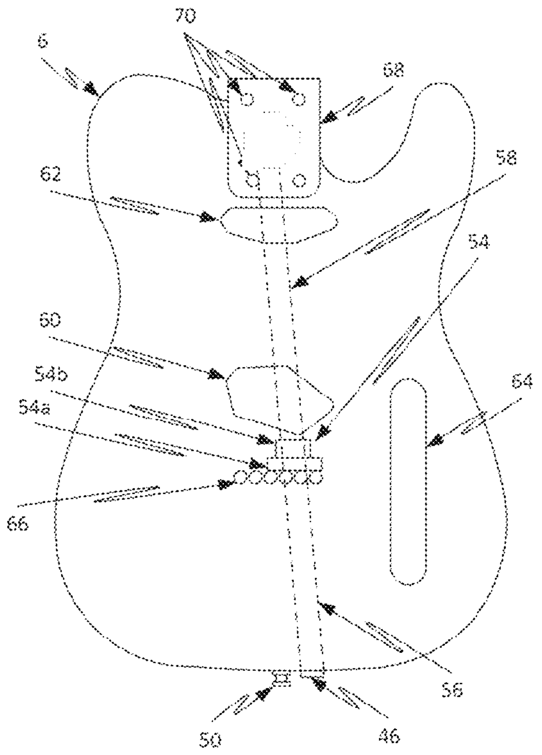
FIGS. 6-7 are front and back views, respectively, of an electric guitar showing the various recesses and bores required to house and/or receive the components forming the pitch changer system according to one aspect of the present invention.
Figure 7:
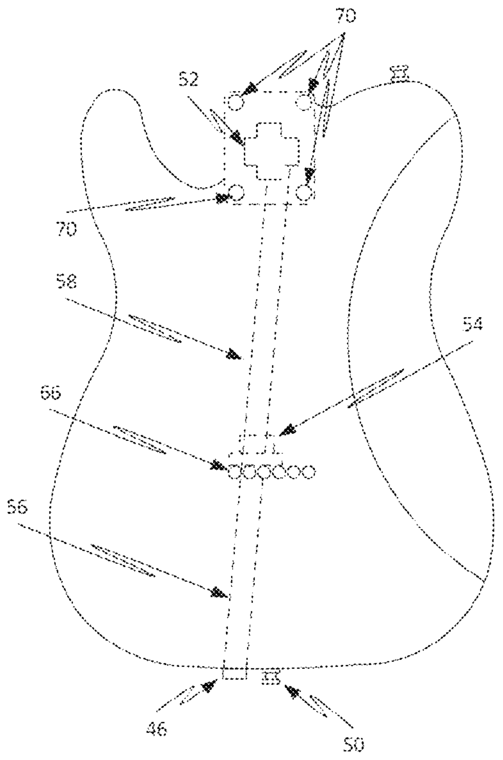

FIGS. 6-7 are front and back views, respectively, of the guitar body 6 without the pick-guard and hardware (e.g. control knobs, pick-up sectors, etc . . . ) of FIGS. 1-2 in order to explain the recesses and bores required to accommodate the various components forming the pitch changer system 10 of the present invention. A lever assembly recess 52 extends from the back surface of the body 6 (FIG. 7) and is dimensioned to accommodate various components forming part of the lever assembly 12. A swing plate recess 54 extends from the front surface of the body 6 (FIG. 6) and includes an upper recess 54*a* dimensioned to accommodate the hinge base 24 and a lower recess 54*b* dimensioned to receive the swing plate 26 and a saddle finger extension (not shown) that projects downward from the saddle finger assembly 22. A lower longitudinal bore 56 (shown in dashed lines in FIGS. 6-7) extends from a point adjacent to the strap button 50 to the swing plate recess 54 and is dimensioned to receive the spring assembly 30 and spring adjustment assembly 32 forming part of the lever tensioning system 18 of FIG. 4. An upper longitudinal bore 58 (shown in dashed lines in FIGS. 6-7) extends from the swing plate recess 54 and is dimensioned to receive the cable assembly 28 forming part of the lever tensioning system. 18 of FIG. 4. Although lower and upper longitudinal bores 56, 58 are shown at slight angles relative to one another in FIGS. 6-7, it will be appreciated that these may be provided any suitable arrangements, including but not limited to straight. The remainder of the recesses are known and common to these prior art guitars, namely in addition to the typical bridge pick up recess 60, a neck pickup recess 62, control assembly recess 64, string bores 66 and a neck recess 68 with bores 70 for bolting the neck 8 to the body 4 as is known in the art.

Figure 8:
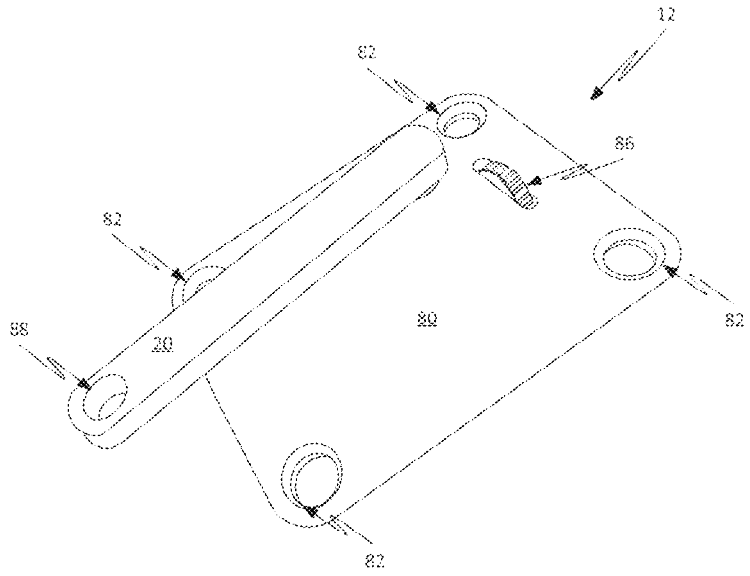
FIGS. 8-9 are perspective views of a lever assembly forming part of the pitch changer system according to one aspect of the present invention (unmounted in FIG. 8 and mounted in FIG. 9)
Figure 9:
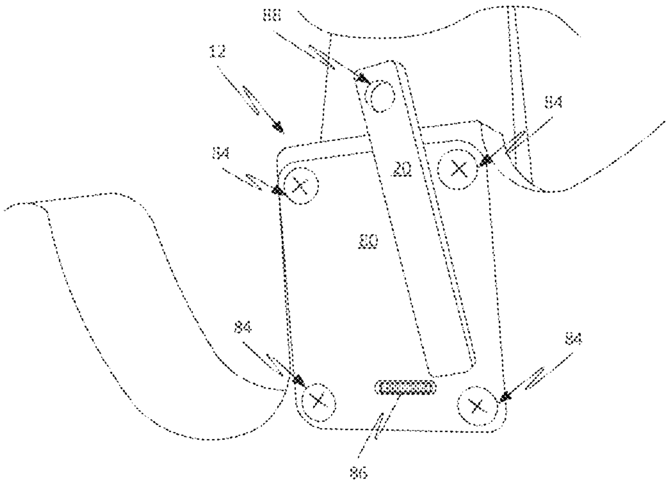

The lever assembly 12 will now be described in detail with reference to FIGS. 8-16. As shown in FIGS. 8-9, the lever assembly 12 includes a mounting plate 80 with a plurality of apertures 82 for receiving screws 84 which, in turn, extend through the apertures 70 formed in the body 6 to accomplish the dual purposes amounting the lever assembly 12 to the body 6 aid mounting the neck 8 to the body 6. In this embodiment, the mounting plate 80 may replace the factory-installed neck plate used to mount the neck 8 to the body 6 during manufacture. Alternatively, the mounting plate 80 may be a dedicated plate used solely for mounting the pitch changer system 10 to the guitar for use and/or may be positioned elsewhere on the back of the guitar 4 other than as shown in FIGS. 8-9. As will be described in greater detail below, the lever assembly 12 also includes a thumb wheel 86 extending through an aperture formed in the mounting plate for the purpose of manually adjusting the degree of rotation of the lever 20 relative to the mounting plate 80, as well as an aperture 88 formed in the distal end of the lever 20 for the purpose of attaching the lever 20 to a guitar strap via any known means (e.g. strap button, strap lock, etc.).

Figure 10:
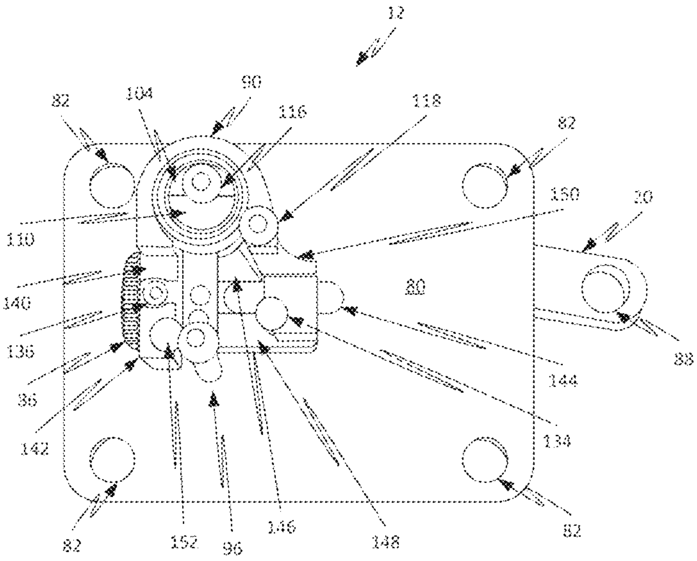
FIGS. 10-11 are top and side perspective views, respectively, of a lever assembly forming part of the pitch changer system according to one aspect of the present invention.
Figure 11:
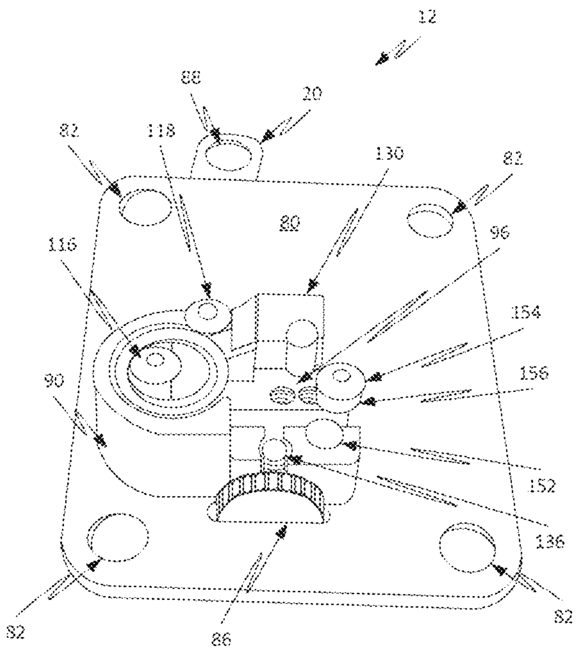
Figure 12:
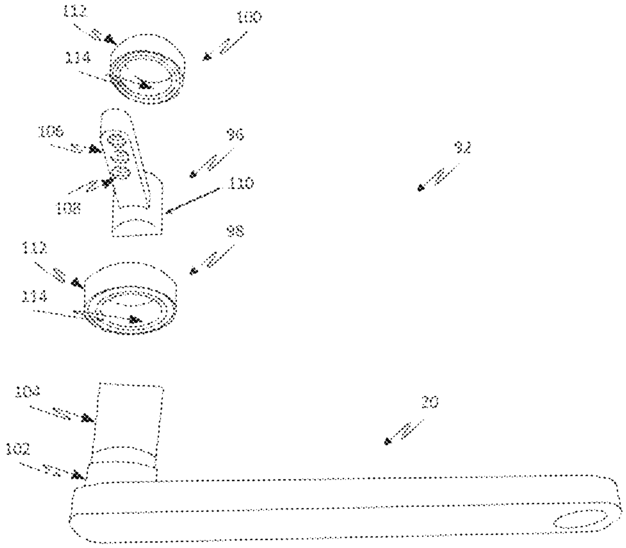
FIG. 12 is a side view of a lever rotation assembly forming part of the pitch changer system according to an aspect of the present invention.
Figure 13:
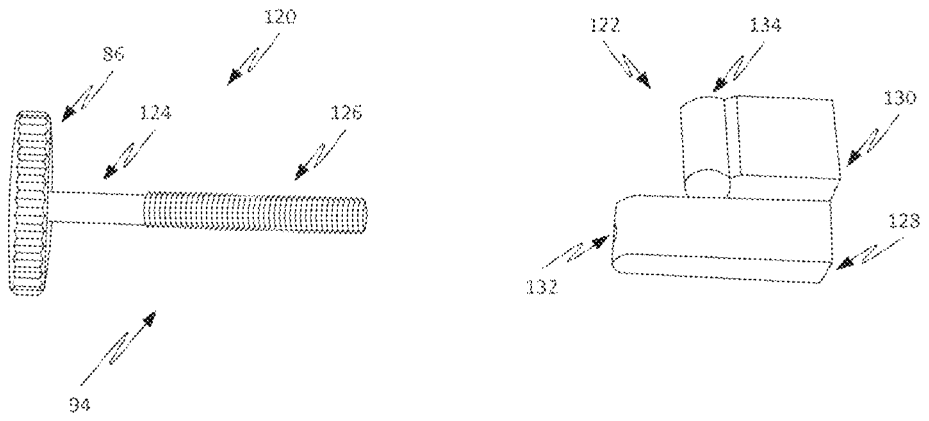
FIGS. 13-14 are top views of a rotation adjustment assembly (disassembled in FIG. 13, assembled in FIG. 14) forming part of the pitch changer system according to an aspect of the present invention.
Figure 14:
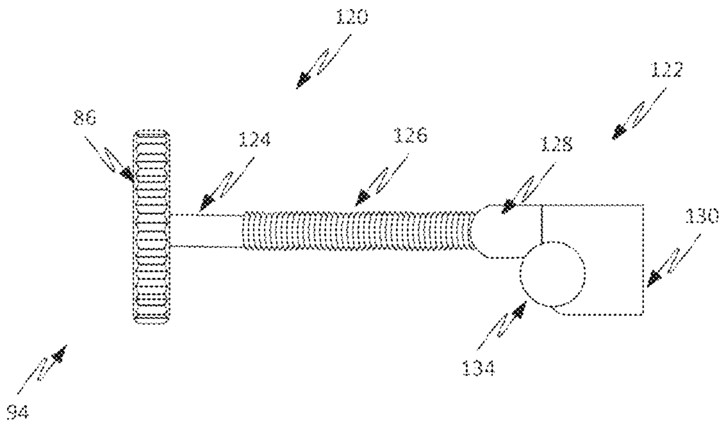
Figure 15:
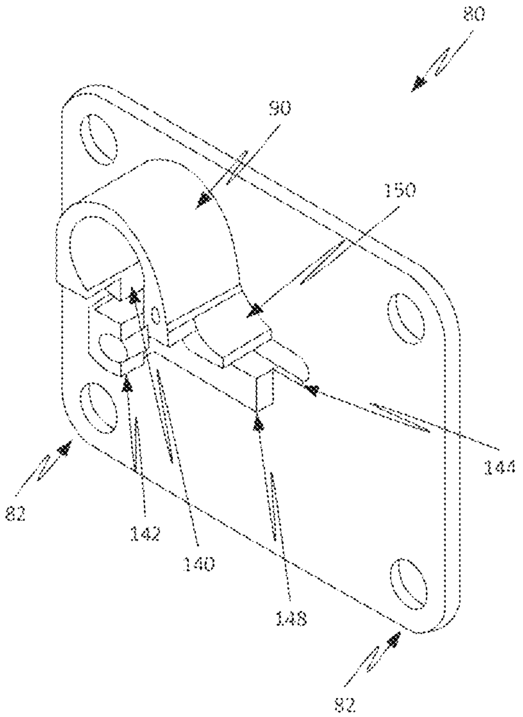
FIGS. 15-16 are perspective and bottom views, respectively, of a mounting plate forming part of the lever assembly according to an aspect of the present invention.
Figure 16:
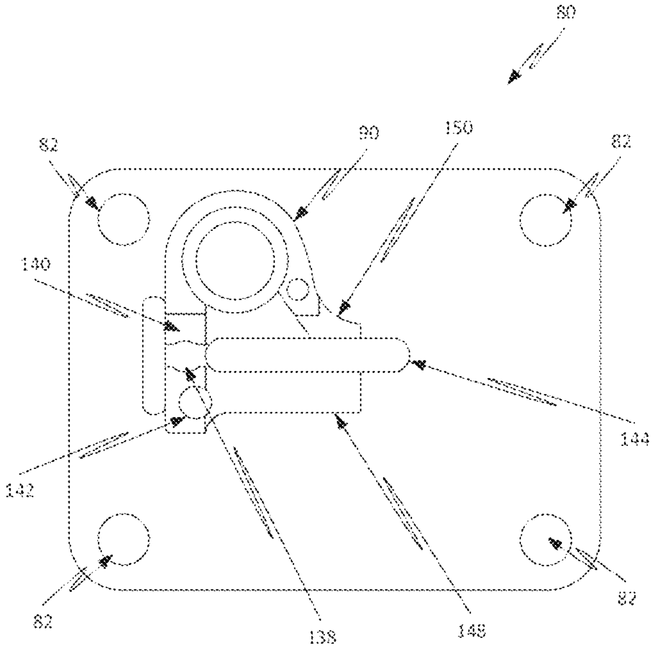

The lever assembly 12 also includes a bearing housing 90 extending generally perpendicularly from the back surface of the mounting plate 80 as shown in FIGS. 10-11, as well as a lever rotation assembly 92 shown in FIG. 12 and a rotation adjustment assembly 94 shown in FIGS. 13-14. The mounting plate 80 and bearing housing 90 may be machined from a singular aluminum block but one or both parts may be made of metal, plastic or other suitable material. The bearing housing 90 may be an integral structural part of the mounting plate 80 or, if not, it inlay be glued, welded, bolted or otherwise securely joined with the mounting plate 80.

The lever rotation assembly 92 (FIG. 12) includes the lever 20, a bell crank 96, and lower and upper bearings 98, 100. The lever 20 includes a cylindrical shaft 102 extending perpendicularly therefrom with a half-shaft 104 extending from the cylindrical shalt 102. The bell crank 96 includes an extension arm 106 with a plurality of holes 108 formed therein and a half-shaft 110 extending generally perpendicularly from the extension arm 106. The half-shaft 104 of the lever 20 and half-shaft 110 of the bell crank 96 are configured to be positioned in mating contact and disposed within the lower bearing 98 and upper bearing 100 within the bearing housing 90 to effectively form a cylindrical shaft within the bearing housing 90. The lower and upper bearings 98, 100 are of identical construction and each includes outer and inner races 112, 114 capable of rotation relative to one another. The outer races 112 are dimensioned to be received within (and in physical abutment with) the bearing housing 90. The inner races 114 are dimensioned to be in contact with exterior surfaces of the half-shafts 104, 110 of the lever 20 and bell crank 96, respectively, when mated and disposed within the lower and upper bearings 98, 100 within the bearing housing 90. In so doing, the lower and upper bearings 98, 100 hold together the half-shafts 104, 110 and allow them to rotate as one with respect to the mounting plate 80 and guitar 4, effectively forming an axle on which the lever 20 and bell crank extension 106 rotate. The bearings 98, 100 may be ball bearings, bushings or an integral part of one or both of the half shafts 104, 110 and can be a variety of different inner and outer diameters to accommodate the shaft and housing configurations. The bell crank 96 may be equipped with two concentric bell crank bearing stops (not shown) which press against the inner races 114 of the lower and upper bearings 98, 100 to maintain the desired spacing of the extension arm 106 of the bell crank 96 and the lower and upper bearings 98, 100 so as to eliminate or minimize friction with the outer race 112 of either or both bearings 98, 100.

To accomplish this, the half-shaft 104 of the lever 20 is advanced into the lumen through an aperture (not shown) from the front of the mounting plate 80 and the lower bearing 98 is installed within a lower portion of the bearing housing 90 with the half-shaft 104 of the lever 20 extending through the inner lumen of the lower bearing 98. The half shaft 110 of the bell crank 96 is then positioned in mating relationship with the half-shaft 104 of the lever 20 and the upper bearing 100 is installed within an upper portion of the bearing housing 90 such that upper sections of the half-shaft 104 of the lever 20 and the half-shaft 110 of the bell crank 96 are disposed in mating relationship within the lumen of the upper bearing 100. As best shown in FIGS. 10-11, with the lower and upper bearings 98, 100 and half-shafts 104, 110 introduced into the bearing housing 90 in this manner, first and second retainer screws 116, 118 are then used to secure these components relative to the mounting plate 80. The first retainer screw 116 is inserted into a threaded hole (not shown) formed in the upper surface of the half-shaft 104 of the lever 20 such that the screw head presses against the upper surface of the half-shaft 110 of the bell crank 96 to prevent the lever 20 from being removed from the bearing housing 90 during use. The second retainer screw 118 is inserted into a threaded hole (not shown) formed in the upper surface of the bearing housing 90 such that the screw head presses against the outer race 112 of the upper bearing 100 to retain the bearings 98, 100, and prevent the entire lever rotation assembly 92 from being pushed beyond its desired depth in the bearing housing 90. The exterior surfaces of the half-shafts 104, 110 are in abutment with the inner races 114 of the lower and upper bearings 98, 100. The mated half-shafts 104, 110 may then rotate within the bearing housing 90 as though constructed as a single shaft or axle.

The rotation adjustment assembly 94 (FIGS. 13-14) includes the thumbwheel 86, a shaft 120 extending perpendicularly from the thumbwheel 86, and an adjustment block 122. The thumbwheel 86 is generally cylindrical in shape and includes notches along the outer periphery to facilitate rotation via manual engagement by a user. The shaft 120 includes a smooth cylindrical section 124 adjacent to the thumb heel 86 and a threaded section 126 extending in a coaxial manner therefrom. The adjustment block 122 includes a lower section 128 and an upper section 130. The lower section 128 is generally elongate and rectangular in shape with a longitudinally arranged threaded aperture 132 dimensioned for threaded engagement with the threaded section 126 of the shaft 120. The upper section 130 is generally square in shape and includes a generally cylindrical tuning stop 134 dimensioned to be a point of contact for the extension arm 106 of the bell crank 96 during rotation when the lever assembly 12 is in use pitch changing according to the present invention. The tuning stop 134 (also known as moving tuning stop 134) may be of manufactured from any of a variety of suitable materials, including plastic to avoid generating noise from said contact during use that may otherwise occur with metal-on-metal contact.

As shown in FIGS. 10-11, the rotation adjustment assembly 94 is coupled to the mounting plate 80 via a set screw 136 dimensioned to threadably engage within a threaded gap 138 formed between a first wall 140 and a second wall 142 extending colinearly from the left side of the bearing housing 90 (FIG. 10). To do so, with the bell crank 96 not yet disposed within the bearing housing 90, the rotation adjustment assembly 94 is positioned such that the smooth cylindrical section 124 rests within the threaded gap 138 and the lower section 128 of the adjustment block 122 is disposed within a channel 144 formed between (and extending slightly beyond) third and fourth walls 146, 148 which extend perpendicularly from the first and second walls 140, 142, respectively, albeit at a shorter height (see also FIGS. 15-16). The set screw 136 may then be rotationally introduced into the threaded gap 138 and tightened until a desired friction is established with the smooth cylindrical section 124 of the shaft 120 extending from the threaded thumbwheel 86. With the bell crank 96 thereafter mounted within the bearing housing 90, the thumbwheel 86 may be rotated in either direction to move the adjustment block 122 within the channel 144. During this travel, the upper section 130 of the adjustment block 122 is guided by a fifth wall 150 extending at an angle from the right side of the bearing housing 90 (FIG. 10), with the same approximate height as first and second walls 140, 142. The second wall 142 includes generally cylindrical tuning stop 152 dimensioned to be a point of contact for the extension arm 106 of the bell crank 96 during rotation when the lever assembly 12 is use pitch changing according to the present invention. The tuning stop 152 (also known as fixed tuning stop 152) may be of manufactured from any of a variety of suitable materials, including plastic to avoid generating noise from said contact during use that may otherwise occur with metal-on-metal contact.

In use, the rotational motion of the extension arm 106 of the bell crank 96 is limited in its extremes by the fixed tuning stop 152 and the movable tuning stop 134. The rotational range of the movable tuning stop 134 may be adjusted by rotating the thumbwheel 86. The thumbwheel 86 may be any suitable material, such as stainless steel, and have a head diameter large enough for the thumbwheel shaft 120 to be mounted on the inner surface of the mounting plate 80 but project enough of the thumbwheel through the aperture (FIG. 16) to the outer surface of the mounting plate 80 so as to be easily adjustable from the outside of said mounting plate 80 (FIGS. 8-9).

The rotational movement of the extension arm 06 of the bell crank 96 is transferred to the cable assembly 28 of the lever tensioning system 18 by virtue of a screw 154 which serves as an attachment point for the cable assembly 28. The screw 154 is threadably engaged within one of the plurality of threaded apertures 108 disposed along the extension arm 106. In this embodiment, the screw 154 is a machine screw with a head that retains the upper loop 36 of the cable assembly 28. An optional washer 156 (nylon or metal) may be used with the screw 154 to serve as an axle about which the upper loop 36 of the cable assembly 28 may be retained and rotate. Although shown as a cable, it will be appreciated that any suitable component may be used to create this mechanical connection between the extension arm 106 and the lever tensioning system 18, including but not limited to a pull rod, cord, wire or any other means of conveyance of the rotational product of the user's motion to the string finger of the saddle assembly to which the selected pitch bending string is connected.

The saddle assembly 14 will now be described in detail with reference to FIGS. 17-20. The saddle assembly 14 includes a mounting plate 160 (FIGS. 17A-17B) configured to be secured to the bridge area on the front of the body 6, a plurality of standard saddle assemblies 162, and the saddle finger assembly 22 of the present invention. The mounting plate 160 includes a plurality of string holes 164 dimensioned to pass strings upwards from the apertures 66 extending from the back of the guitar 4 (FIG. 2) or through the back wall or base of the mounting plate 160, as well as first and second elongated slots 166, 168 formed adjacent to (and leading away from) the string holes 164 associated with the B-string and G-string of the guitar 4.

Figure 19:
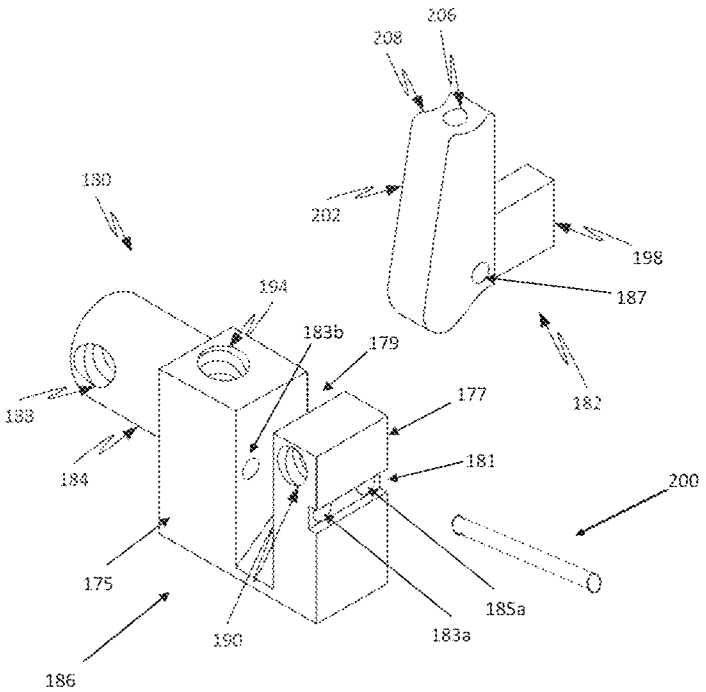
Figure 20:
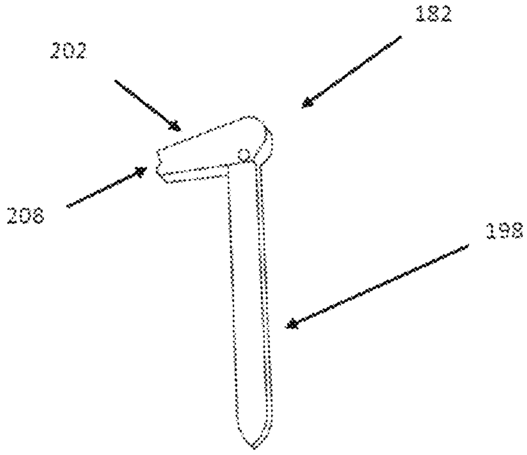
FIG. 20 is a side view of a rotating saddle assembly (including rotating saddle and extension arm) forming part of the pitch changer system according to an aspect of the present invention.

The rotating saddle assembly 22 (FIGS. 18-19) includes a saddle block 180 and rotating saddle 182 (FIG. 20). The saddle block 180 includes static string saddle 184 and a hinge block 186 for hingedly receiving the rotating saddle 182 to selectively string bend to accomplish pitch-changing according to the present invention. The saddle block 180 may be height adjusted relative to the mounting plate 160 for string action adjustment via the use of set screws threadably engaged within threaded bores 188, 190 formed in the static string saddle 184 and hinge block 186, respectively. The saddle block 180 may be longitudinally adjusted relative to the mounting plate 160 for intonation adjustment via the use of an adjustment screw 192 threadably engaged within a threaded bore 194 formed in the hinge block 186. The hinge block 186 includes a first wall section 175, a second wall section 177 spaced apart from and parallel to the first wall section 175 to define a rotation gap 179 therebetween dimensioned to receive the rotating saddle 182, and a side groove 181 extending vertically between upper and lower surfaces of the second wall section 177.

The side groove 181 includes a pair of horizontal bores 183*a*, 185*a* extending perpendicularly through the second wall section 177. The horizontal bores 183*a*, 185*a* are co-aligned with a pair of horizontal bores 183*b*, 185*b* (not shown) extending into a first wall section 175 of the hinge block 186. The horizontal bores 183, 185 are dimensioned to slidably receive a hinge pin 200 (FIG. 19) dimensioned to pass through a hinge bore 187 formed horizontally through the rotating saddle 182 for the purpose of hingedly coupling the rotating saddle 182 within the rotation gap 179. Depending upon the orientation of the rotating saddle assembly 22 (e.g. for pitch changing the G-string or B-string on a guitar), the horizontal bores 183*a*, 183*b* may be higher or lower than the horizontal bores 185*a*, 185*b* (not shown). In either instance, the rotating saddle 182 will always be configured within the rotation gap 179 such that the hinge pin 200 extends through the lower pair of the horizontal bores 183, 185.

Figure 18:
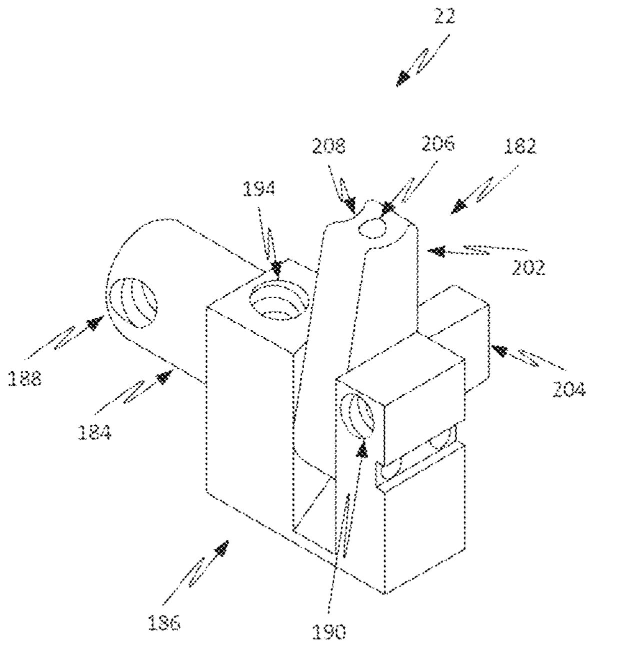
FIGS. 18-19 are perspective and exploded views, respectively, of a rotating saddle assembly (including saddle block and rotating saddle) forming part of the pitch changer system according to an aspect of the present invention.

As best shown in FIG. 20, the rotating saddle 182 includes an upper section 202 and an extension arm 198 extending from the upper section 202, (Note that FIGS. 18-19 show the rotating saddle 182 with only a portion of the extension arm 198, while in use the rotating saddle 182 is shown fully in FIG. 20). The upper section 202 is hingedly coupled within the hinge block 186 via the hinge pin 200 that extends through the hinge bore 187 (FIG. 19). The hinge pin 200 may be of any suitable material, including stainless steel, but could also be a screw or hook may of any suitable material. The upper section 202 includes a string bore 206 extending longitudinally between first and second ends of the upper section 202 and a generally concave surface 208 at the first end to retain a typical ball end string termination. The extension arm 198 extends generally perpendicularly away from the lower surface of the upper section 202 of the rotating saddle 182.

When the saddle block 180 is mounted to the mounting plate 160, the extension arm 198 will be positioned within one of the elongated slots 166, 168 formed in the mounting plate 160, for example the elongated slot 166 for the G-string as shown FIG. 17, to cooperate with the swing plate assembly 16 as will be described below. To mount a string for pitch changing, the straight end of the string must be passed into the opening of the string bore 206 at the first end of the upper section 202, out the opening of the string bore 206 at the second end of the upper section 202, and then over the upper surface of the upper section 202 until the ball-end of the string rests against the concave end surface 208. The straight end of the string may be secured to the tuning machine and tuned as is well known in the art. The extension arm 198 may be a separate component or integrally formed as part of the rotating saddle 182. If separate, the extension arm 198 may be mounted to the upper section 202 in any known manner, such as via advancing an end of the extension arm 198 into a bore formed within the lower surface of the upper section 202 and affixing through the use of glue, welding, threads, etc. . . . If integral (as shown in FIG. 20), the extension arm 198 and rotating saddle 182 may be manufactured as a single article via machining, injection molding, 3D printing, etc. . . .

Figure 17A:
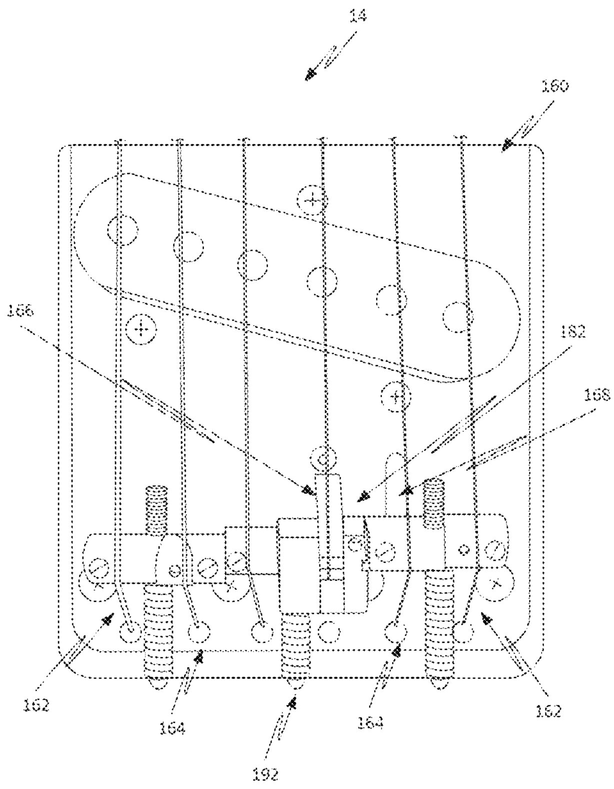
FIGS. 17A-17B are top views of a saddle assembly respectively with and without a saddle finger assembly forming part of the pitch changer system according to an aspect of the present invention.
Figure 17B:
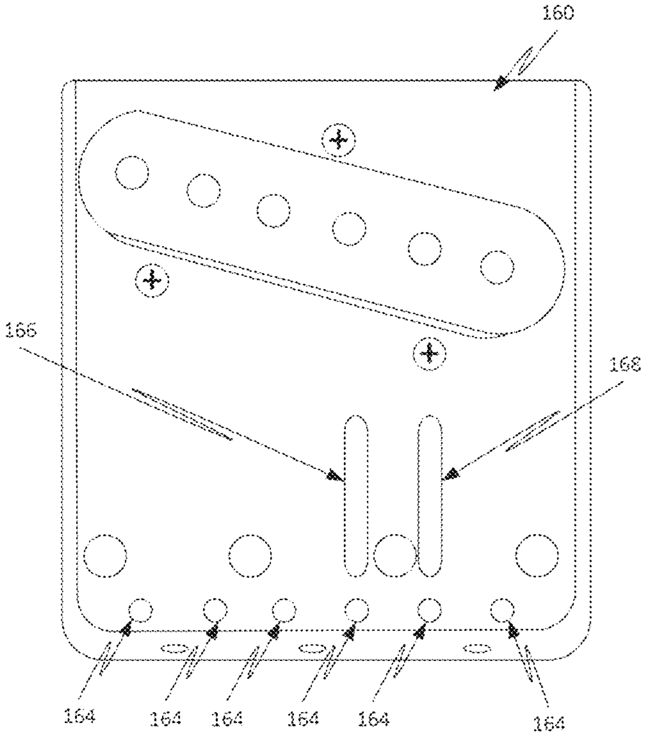

The pitch changer system 10 of the present invention boasts the ability to quickly and easily reverse the rotating saddle 182 within the hinge block 186 for the purpose of pitch changing multiple strings, such as (by way of example only) the G string and B string. To pitch change the G-string, the rotating saddle 182 will be positioned as shown in FIG. 17A, with the extension arm 198 and lower section 204 extending through elongated aperture 166 in the mounting plate 160. To reverse for B-bending, the rotating saddle 182 will be removed from the mounting plate 160 (by removing screw 192), at which point the hinge pin 200 may be removed (e.g. via needle-nose pliers) such that the rotating saddle 182 can be separated from the hinge block 186. To reverse the orientation of the rotating saddle 182, the saddle block 180 must be rotated 180 degrees and the rotating saddle 182 positioned within the hinge block 186 such that the hinge pin 200 may be introduced into the lower of the horizontal bores 183, 185 to hingedly couple the rotating saddle 182 to the hinge block 186 within the rotation gap 179.

The saddle block 180 includes asymmetrical string length compensation when the saddle block 180 is reversed according to an aspect of the present invention. More specifically, the static saddle 184 includes a first static saddle region located on a first surface that defines a first string intonation location when the static saddle 184 is in a first orientation with the rotating saddle 182 positioned within a first slot in the mounting plate, as well as a second static saddle region located on a second surface (opposite from the first surface) that defines a second string intonation location when in a second orientation (e.g. when the saddle block 180 is reversed and the rotating saddle 182 is positioned within a second slot adjacent to the first slot in the mounting plate. In one exemplary embodiment, the first string intonation location is to intonate a G-string on a guitar and the second string intonation is to intonate a B-string on a guitar. Upon reversal of the rotating saddle assembly 22, this advantageously provides automatic string length compensation by: a) automatically positioning the first string intonation location of the static saddle 184 of the rotating saddle assembly 22 for engagement with the G-string on a guitar when the rotating saddle member 182 is coupled for temporary pitch changing on the B-string of the guitar; and b) automatically positioning the second string intonation location of the static saddle 184 of the rotating saddle assembly 22 for engagement with the B-string on a guitar when the rotating saddle member 182 is coupled for temporary pitch changing on the G-string of the guitar.

To retain the height adjustability, the set screws must be removed and re-introduced vertically downward into the threaded bores 188, 190 formed in the static string saddle 184 and hinge block 186, respectively. With the rotating saddle 182 now reversed relative to the hinge block 186, and the saddle block 180 equipped to height-adjust in the new orientation, the saddle block 180 may be re-mounted to the plate 160 such that the extension arm 198 extends through the elongated aperture 168. The string may be replaced such that the B-string is coupled to the upper section 202 of the rotating saddle 182 in the manner described above and the high E string is strung over the static saddle 184.

By combining the static saddle 184 and the rotating saddle 182 on one assembly, the string force of the static saddle 184 helps create contact between the height adjustment screw of the rotating saddle 182 and the bridge mounting plate (now shown). A single screw is used for string length compensation adjustment to allow simultaneous adjustment of both static saddle 184 and the rotating saddle 182. The string length compensation adjustment screw hole 194 also includes an offset angle to compensate for asymmetrical string force on the combination of the static saddle 184 and the rotating saddle 182.

Figure 21:
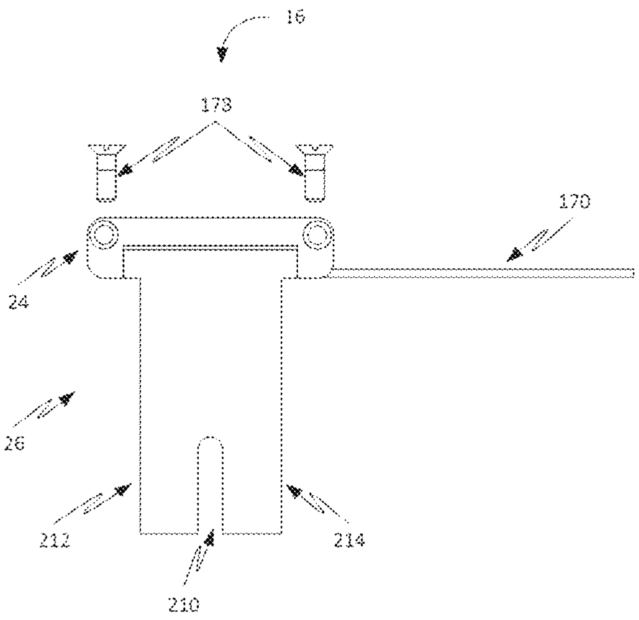
FIG. 21 is a front view of a swing plate assembly (including hinge base, swing plate, hinge pin, and mounting screws) forming part of the pitch changer system according to an aspect of the present invention.
Figure 22:
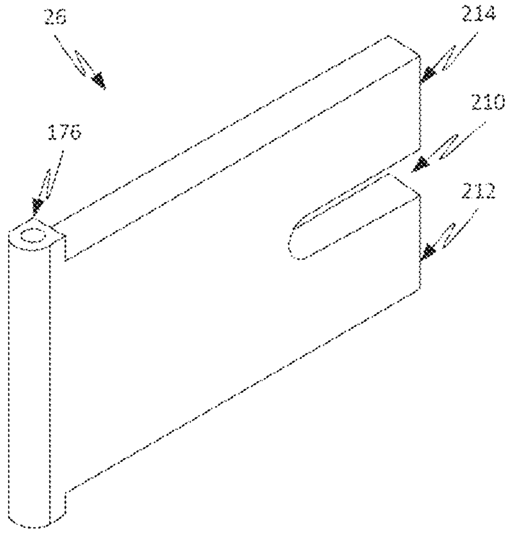
FIGS. 22-23 are perspective views, respectively, of the swing plate and hinge base of the swing plate assembly forming part of the pitch changer system according to an aspect of the present invention.
Figure 23:
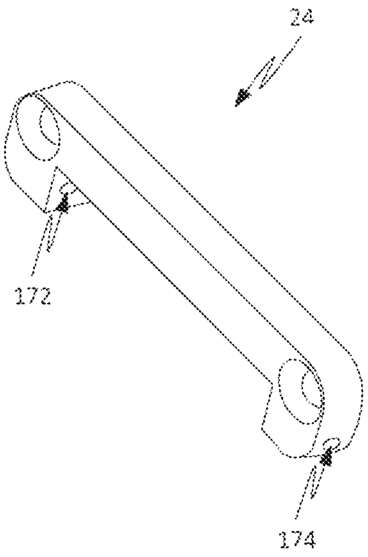

The swing plate assembly 16 will now be described in detail with reference to FIGS. 21-23. The swing plate assembly 16 includes the swing plate 26 hingedly coupled to the hinge base 24 via a hinge pin 170 that passes longitudinally through bores 172, 174 in the hinge base 24 and bore 176 in the swing plate 26 when coaligned. The hinge base 24 may be made of any suitable material, including but not limited to acetal plastic to reduce friction. The swing plate 26 can be made of any suitable material, including but not limited to metal, plastic or other material suitable to achieve the desired function. The hinge base 24 is mounted within recess 54*a* of FIG. 6 to be substantially flush and parallel with the top surface of the body 6 and located under mounting plate 160 of the saddle assembly 14. To do so, mounting screws 178 may be passed vertically into the body 6 to fix the hinge base 24 in position during use. It will be appreciated, however, that the hinge base 24 may alternatively be mounted above or below the surface of the body 6 or to the mounting plate 160 itself. The swing plate 26 may or may not have an attitude offset (not shown) to compensate for the correction in string length necessary for a change in the selected activated pitch bending string.

Figure 24A:
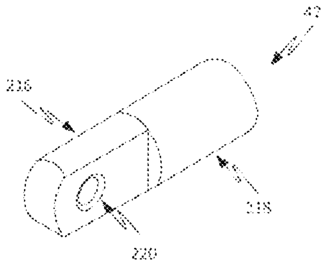
FIGS. 24A-24D include a variety of views of an upper coupler of a spring assembly of the lever tensioning assembly forming part of the pitch changer system according to an aspect of the present invention.
Figure 24B:
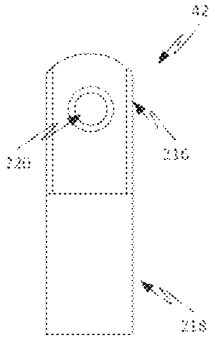
Figure 24C:
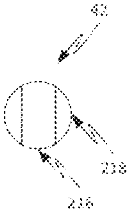
Figure 24D:
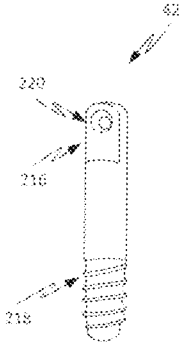

The swing plate 26 extends generally downward from the hinge base 24 into the recess 54*b* of FIG. 6 and includes an elongated gap 210 that defines first and second leg portions 212, 214. The first and second leg portions 212, 214 are generally planar and function as contact regions for the extension arm 198 of the rotating saddle 182 during use, as will be described below. The elongated gap 210 is dimensioned to engage the upper coupler 42 of the lever tensioning system 18 for the purpose of subjecting the swing plate 26 to the spring tension from the spring 40 during use. More specifically, with reference to FIGS. 24A-24D, the upper coupler 42 of the lever tensioning assembly 18 includes a tip region 216 extending from a generally cylindrical base region 218. The tip region 216 is generally planar and includes an aperture 220 for coupled engagement with the lower loop 38 of the cable assembly 28. The planar nature of the tip region 216 fits through the slot 210 in swing plate 26 in such a way as to prevent the upper couple 42 of spring assembly 18 from rotating when the adjustment screw 48 is turned clockwise or counter-clockwise to tighten or loosen the spring assembly tension on the cable 34 and thus on the lever assembly 12. While shown in FIGS. 24A-24C with a smooth exterior, as shown in FIG. 24D the base region 218 may be configured with threads to engage within the spring 40 for the purpose of coupling the base region 218 to the spring 40. The base region 218 may also have a threaded interior hole that can accept a threaded rod that then engages with another insert 44 in the upper end of the spring 40. The tip region 216 extends in a generally parallel manner through the elongated gap 210 of the swing plate 26 such that the lower loop 38 of the cable assembly 28 is positioned on the front side of the swing plate 26 while the base region 218 is positioned on the back side of the swing plate 26. The upper coupler 42 may be constructed from any of a variety of suitable materials, including but not limited to plastic or metal.

When the lever tensioning system 18 is fully assembled, the upper loop 36 of the cable assembly 28 is coupled to the extension arm 106 of the bell crank 96 of the lever assembly 12, the lower loop 38 is coupled to the upper coupler 42 of the spring assembly 30, and the adjustment screw 48 of the spring adjustment assembly 32 is threadably engaged within the lower coupler 44 of the spring assembly 30. In this configuration, any rotational movement of the lever 20 will cause the spring 40 to stretch and elongate within the lower longitudinal bore 56 within the body 6, which in turn forces the swing plate 26 to rotate about hinge pin 170. Due to the physical contact between the extension arm 198 of the rotating saddle 182 and a select leg portion 212, 214 of the swing plate 26, this rotation of the swing plate 26 causes the rotating saddle 182 to rotate about the hinge pin 200 in the saddle block 180. Rotation of the rotating saddle 182, in turn, causes the string passing over the upper surface of the upper section 202 to increase in length and thereby changes the pitch until rotational force is removed from the lever 20. With rotational force removed from the lever 20 (such as by allowing the guitar strap to go lax or tipping the neck of the guitar up), the tension of the spring 40 causes it to shorten so the swing plate 26 (engaged with the upper coupler 42 that is attached to the spring 40) returns to its normal state extending perpendicularly downward from the hinge base 24, which in turn allows the saddle finger assembly 22 to rotate back to its normal-tuning state under the tension of the string.

Figure 25:
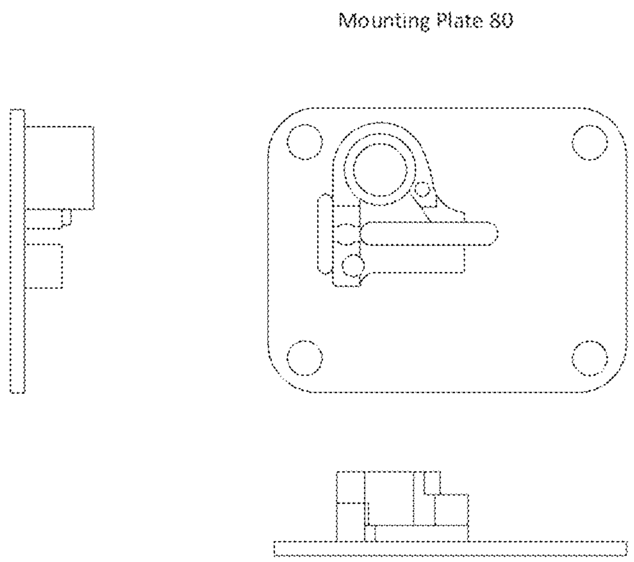
FIG. 25 includes a plurality of views of the mounting plate of the lever assembly forming part of the pitch changer system of the present invention.
Figure 26:
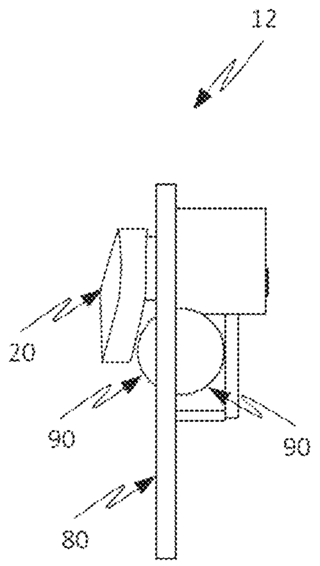
FIGS. 26-28 include a plurality of views of the lever assembly forming part of the pitch changer system of the present invention.
Figure 27:
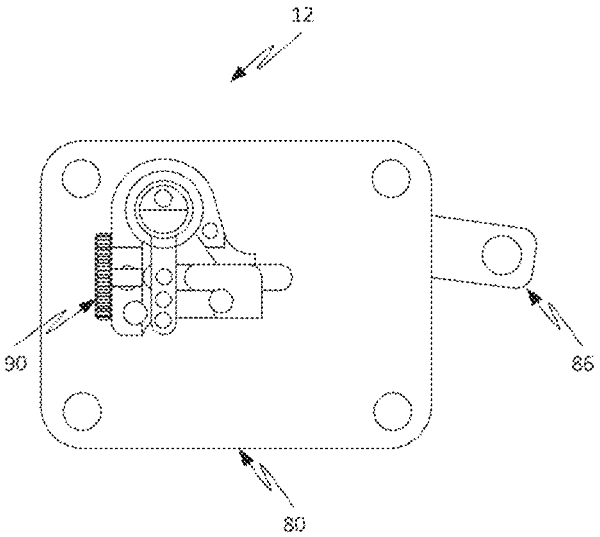
Figure 28:
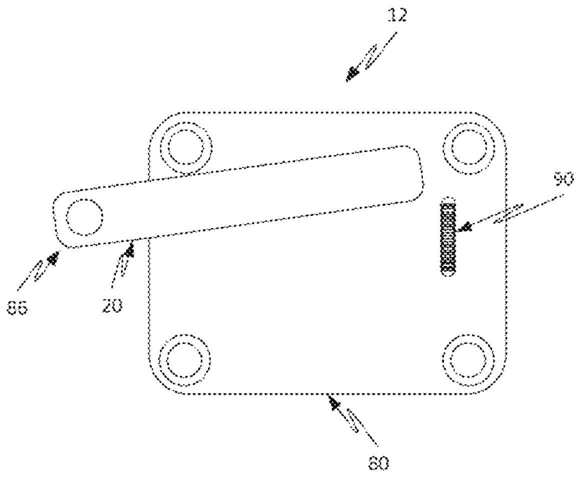
Figure 29:
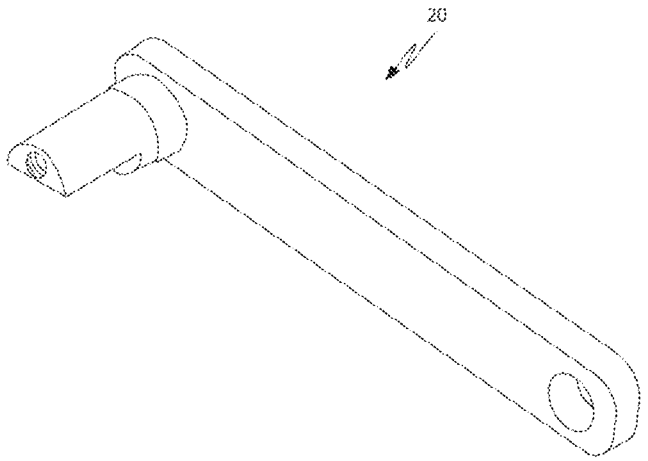
FIGS. 29-30 include a plurality of views of the lever of the lever assembly forming part of the pitch changer system of the present invention.
Figure 30:
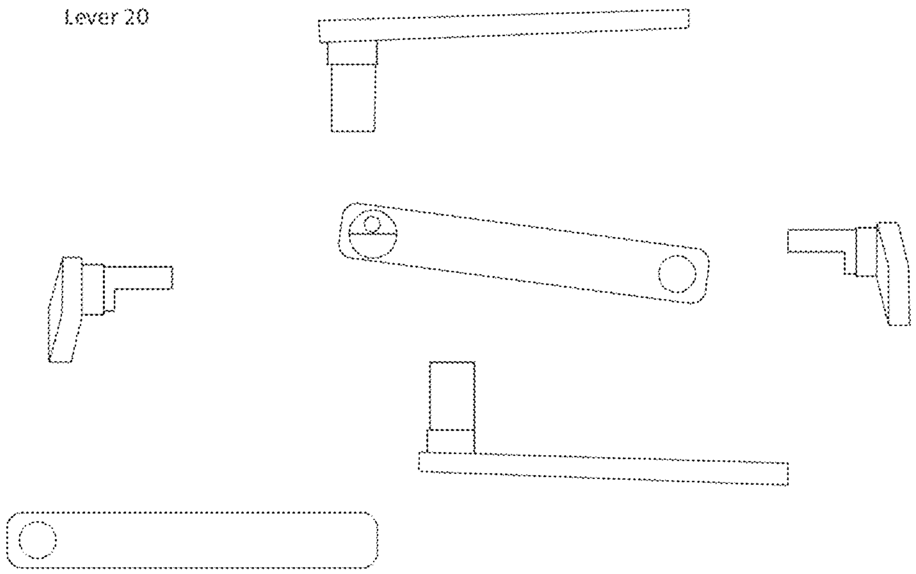
Figure 31:
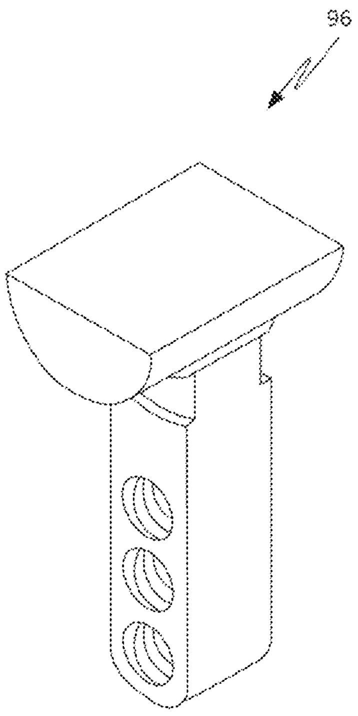
FIGS. 31-32 include a plurality of views of the bell crank of the lever assembly forming part of the pitch changer system of the present invention.
Figure 32:
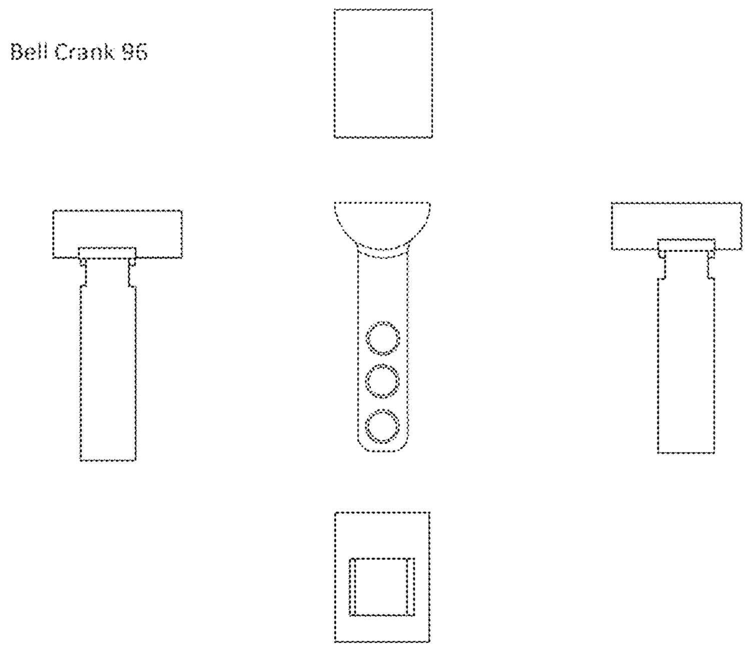
Figure 33:
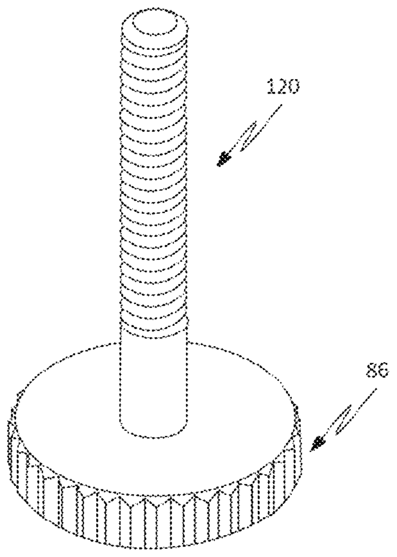
FIGS. 33-34 include a plurality of views of the thumbwheel and shaft of the rotation adjustment assembly forming part of the pitch changer system of the present invention.
Figure 34:
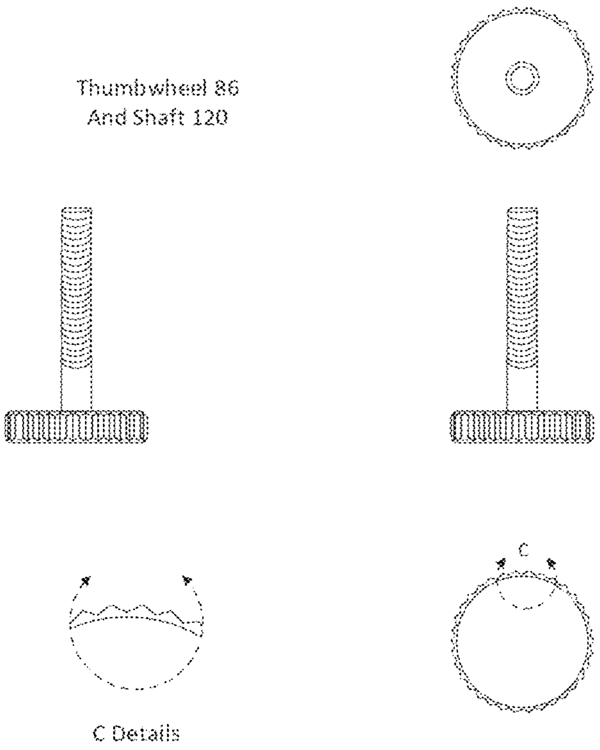
Figure 35:
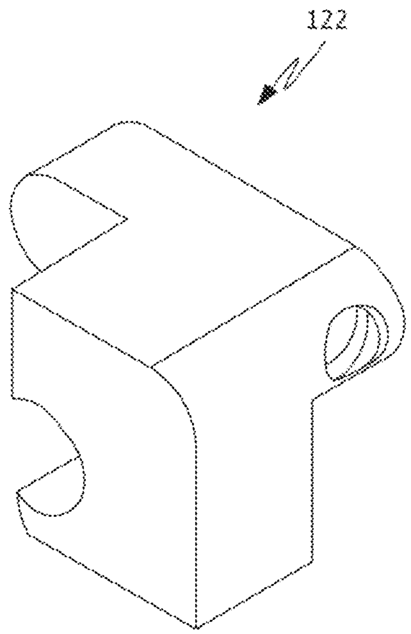
FIGS. 35-36 include a plurality of views of the adjustment block of the rotation adjustment assembly forming part of the pitch changer system of the present invention.
Figure 36:
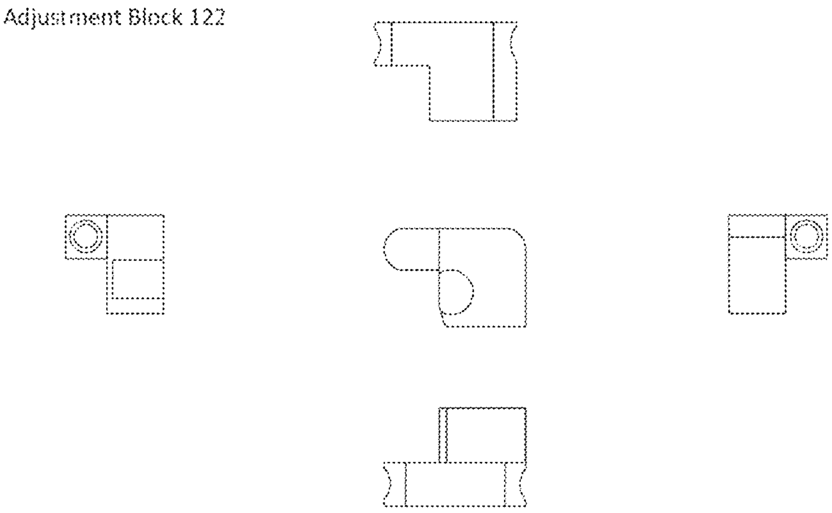
Figure 37:
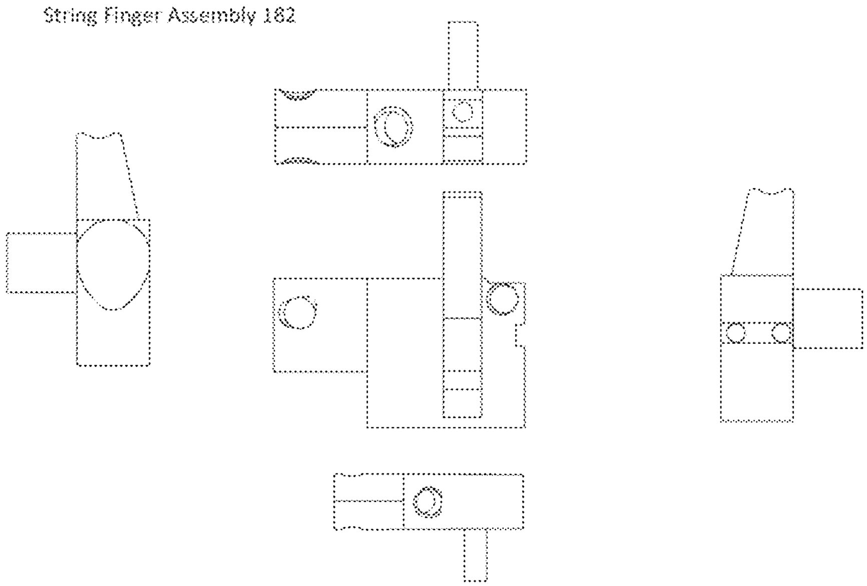
FIG. 37 includes a plurality of views of the rotating saddle assembly forming part of the pitch changer system of the present invention.
Figure 38:
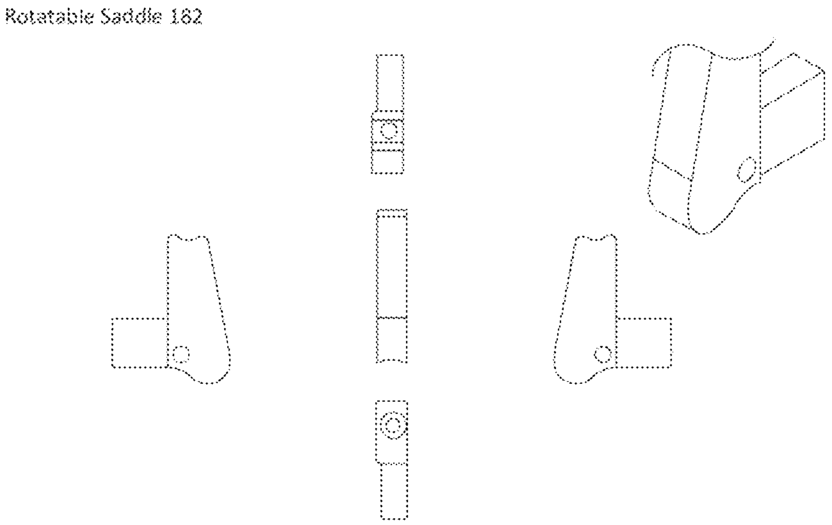
FIG. 38 includes a plurality of views of the rotating saddle member of the rotating saddle assembly forming part of the pitch changer system of the present invention.
Figure 39:
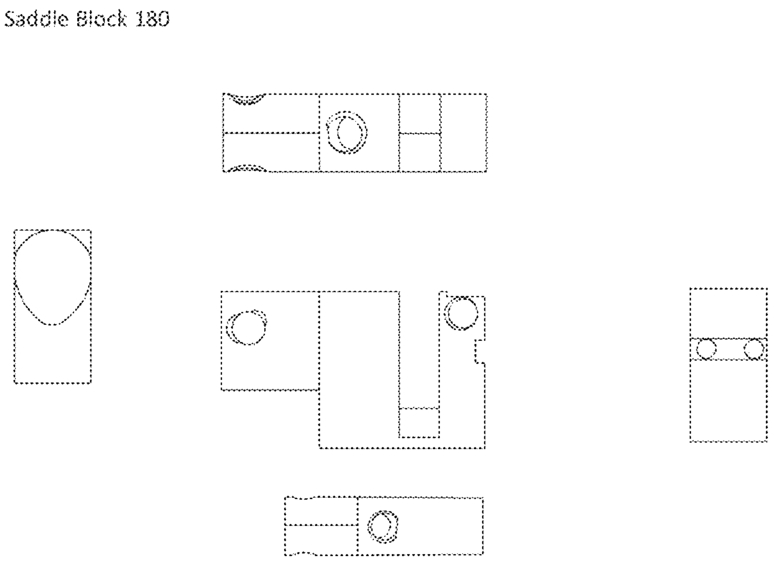
FIG. 39 includes a plurality of views of the saddle block of the rotating saddle assembly forming part of the pitch changer system of the present invention.
Figure 40:
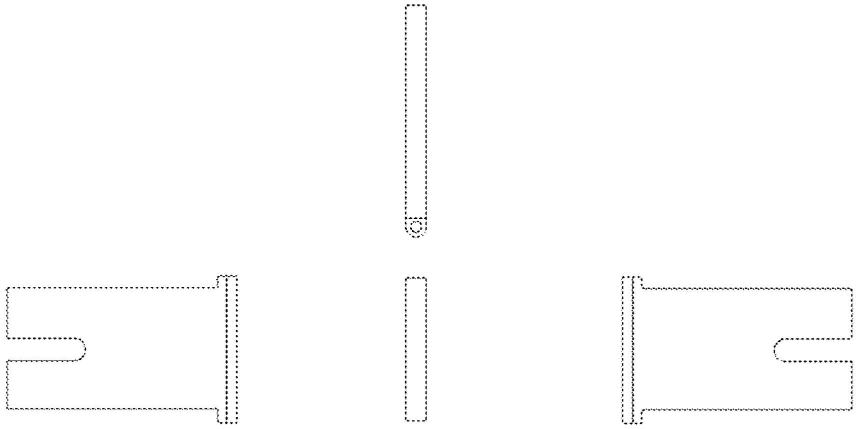
FIG. 40 includes a plurality of views of the swing plate of the swing plate assembly forming part of the pitch changer system of the present invention.
Figure 41:
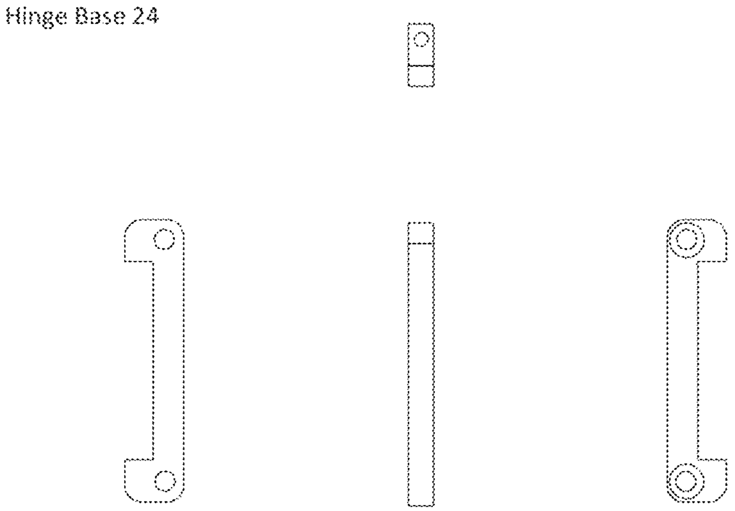
FIG. 41 includes a plurality of views of the hinge base of the swing plate assembly forming part of the pitch changer system of the present invention.
Figure 42A:
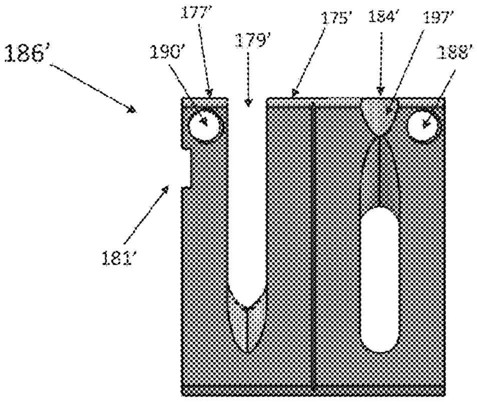
FIGS. 42A-42D are top, bottom, side and end view, respectively, of an alternate saddle block forming part of the pitch changer system according to an aspect of the present invention.
Figure 42B:
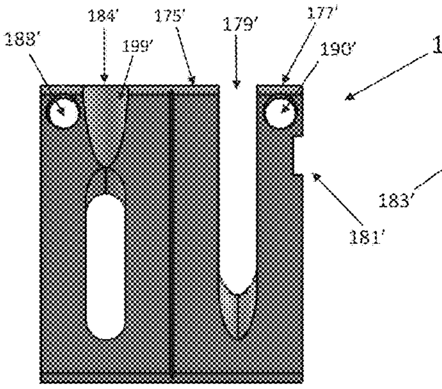
Figure 42C:
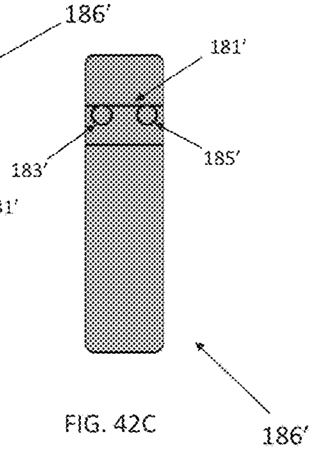
Figure 42D:
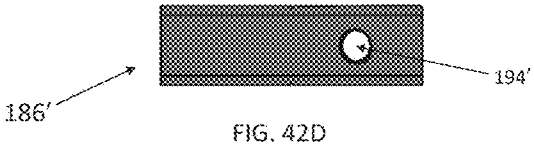

A variety of drawings with exemplary designs are provided as follows: FIG. 25—Mounting plate 80; FIGS. 26-28—lever assembly 12; FIGS. 29-30—lever 20; FIGS. 31-32—bell crank 96; FIGS. 33-34 thumbwheel 86 and shaft 120 of the rotation adjustment assembly 94; FIGS. 35-36—adjustment block 122 of the rotation adjustment assembly 94; FIG. 37—saddle assembly 14; FIG. 38—rotating saddle 182; FIG. 39—saddle block 180; FIG. 40—swing plate 26; and FIG. 41—hinge base 24. It will be appreciated that the components set forth in FIGS. 25-41 may have any of a variety of suitable dimensions and that any or all of the components forming the pitch changer system 10 of the present invention may be modified without departing from the scope of the invention.

For example, as set forth in FIGS. 42A-42D, an alternative version of the saddle block 180 of the rotating saddle assembly 22 may be provided, denoted with primes for clarity of explanation as follows. The saddle block 180 of FIGS. 18-19 is preferably designed for a Fender Telecaster, while the saddle block 180' of FIGS. 42A-42D is preferably designed for a Fender Stratocaster. The saddle block 180' includes static string saddle 184' and a hinge block 186' for hingedly receiving the rotating saddle 182 (FIG. 20) to selectively string bend to accomplish pitch-changing according to the present invention. The saddle block 180' may be height adjusted relative to the mounting plate (not shown) for string action adjustment via the use of set screws threadably engaged within threaded bores 188', 190' formed in the static string saddle 184' and hinge block 186', respectively. The saddle block 180' may be longitudinally adjusted relative to the mounting plate (not shown) for intonation adjustment via the use of an adjustment screw 192' threadably engaged within a threaded bore 194' formed in the hinge block 186'. The hinge block 186' includes a first wall section 175', a second wall section 177' spaced apart from and parallel to the first wall section 175' to define a rotation gap 179' therebetween dimensioned to receive the rotating saddle 182 (FIG. 20), and a side groove 181' extending vertically between upper and lower surfaces of the second wall section 177'.

The side groove 181' includes a pair of horizontal bores 183*a'*, 185*a'* extending perpendicularly through the second wall section 177'. The horizontal bores 183*a'*, 185*a'* are co-aligned with a pair of horizontal bores 183*b'*, 185*b'* (not shown) extending into a first wall section 175' of the hinge block 186'. The horizontal bores 183', 185' are dimensioned to slidably receive the hinge pin 200 (FIG. 19) dimensioned to pass through the hinge bore 187 formed horizontally through the rotating saddle 182 for the purpose of hingedly coupling the rotating saddle 182 within the rotation gap 179'. Depending upon the orientation of the rotating saddle assembly 22 (e.g. for pitch changing the G-string or B-string on a guitar), the horizontal bores 183*a'*, 183*b'* may be higher or lower than the horizontal bores 185*a'*, 185*b'* (not shown). In either instance, the rotating saddle 182 will always be configured within the rotation gap 179' such that the hinge pin 200 extends through the lower pair of the horizontal bores 183', 185'.

As with the embodiment of FIGS. 17-19 (Fender Telecaster), the pitch changer system 10 of the present invention utilizing the alt rate saddle block 180' of FIGS. 42A-42D (Fender Stratocaster) boasts the ability to quickly and easily reverse the rotating saddle 182 within the saddle block 180' for the purpose of pitch changing multiple strings, such as (by way of example only) the G string and B string. To pitch change the G-string, the rotating saddle 182 will be positioned with the extension arm 198 extending through an elongated aperture adjacent the G-string in the mounting plate (not shown). To reverse for B-bending, the rotating saddle 182 will be removed from the mounting plate, at which point the hinge pin 200 may be removed (e.g., via needle-nose pliers) such that the rotating saddle 182 can be separated from the hinge block 186'. To reverse the orientation of the rotating saddle 182, the saddle block 180' must be rotated 180 degrees and the rotating saddle 182 positioned within the hinge block 186' such that the hinge pin 200 may be introduced into the lower of the horizontal bores 183', 185' to hingedly couple the rotating saddle 182 to the hinge block 186' within the rotation gap 179'.

The saddle block 180' includes asymmetrical string length compensation when the saddle block 180' is reversed according to an aspect of the present invention. More specifically, the static saddle 184' includes a first static saddle region 197' located on a first surface that defines a first string intonation location when the static saddle 184' is in a first orientation with the rotating saddle 182 positioned within a first slot in the mounting plate (not shown), as well as a second static saddle region 199' located on a second surface (opposite from the first surface) that defines a second string intonation location when in a second orientation (e.g. when the saddle block 180' is reversed and the rotating saddle 182 is positioned within a second slot adjacent to the first slot in the mounting plate (not shown), In one exemplary embodiment, the first string intonation location s to intonate a G-string on a guitar and the second string intonation is to intonate a B-string on a guitar. Upon reversal of the rotating saddle assembly 22, this advantageously provides automatic string length compensation by: a) automatically positioning the first string intonation location 197' of the static saddle 184' of the rotating saddle assembly 22 for engagement with the G-string on a guitar when the rotating saddle member 182 is coupled for temporary pitch changing on the B-string of the guitar; and b) automatically positioning the second string intonation location 199' of the static saddle 184 of the rotating saddle assembly 22 for engagement with the B-string on a guitar when the rotating saddle member 182 is coupled for temporary pitch changing on the G-string of the guitar.

To retain the height adjustability, the set screws must be removed and re-introduced vertically downward into the threaded bores 188', 190' formed in the static string saddle 184' and hinge block 186', respectively. With the rotating saddle 182 now reversed relative to the hinge block 186', and the saddle block 180' equipped to height-adjust in the new orientation, the saddle block 180' may be re-mounted to the mounting plate such that the extension arm 198 extends through the elongated aperture adjacent to the B-string. The string may be replaced such that the B-string is coupled to the upper section 202 of the rotating saddle 182 in the manner described above and the high E string is strung over the static saddle 184'.

By combining the static saddle 184' and the rotating saddle 182 on one assembly, the string force of the static saddle 184' helps create contact between the height adjustment screw of the rotating saddle 182 and the bridge mounting plate (now shown). A single screw is used for string length compensation adjustment to allow simultaneous adjustment of both static saddle 184' and the rotating saddle 182. The string length compensation adjustment screw hole 194' also includes an offset angle to compensate for asymmetrical string force on the combination of the static saddle 184' and the rotating saddle 182.

Any of the features or attributes of the above the above described embodiments and variations can be used in combination with any of the other features and attributes of the above described embodiments and variations as desired. From the foregoing disclosure and detailed description of certain preferred embodiments, it is also apparent that various modifications, additions and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

The invention claimed is:

1. A pitch changer system for a stringed musical instrument having a body and a neck, comprising:

a lever assembly, a lever tensioning system, and a rotating saddle each configured to be mounted to a body of said stringed musical instrument;

said lever assembly including:

a mounting plate having a bearing housing extending from a lower surface, a lever aperture, and an adjustment member aperture;

a lever having a lever shaft and a lever arm, the lever shaft extending through said lever aperture and configured to be rotationally moved within the bearing housing of the mounting plate, and the lever arm extending from the lever shaft; and a rotation adjustment assembly to selectively adjust a rotational range of said lever, wherein said rotation adjustment assembly includes an adjustment member that extends through said adjustment member aperture of said mounting plate; and said lever tensioning system configured to adjust a tension level of said lever of said integrated lever assembly, wherein applying force to move said lever arm in a first direction forces said rotating saddle into rotation to elongate and thereby temporarily change the pitch of a string coupled to said rotating saddle.

2. The pitch changer system of claim 1, wherein said lever assembly includes at least one bearing assembly disposed within said bearing housing, wherein said at least one bearing assembly is configured to receive at least a portion of a bell crank shaft and at least a portion of said lever shaft.

3. The pitch changer system of claim 2, wherein said at least one bearing assembly of said lever assembly includes an upper bearing assembly and a lower bearing assembly each disposed within said bearing housing and configured to enable the rotation of said lever and said bell crank.

4. The pitch changer system of claim 2, wherein said at least one bearing assembly of said lever assembly is retained within said bearing housing via at least one retainer screw configured to be received within a threaded aperture formed in a side wall of said bearing housing.

5. The pitch changer system of claim 2, wherein at least one of said lever shaft and said bell crank shaft includes a threaded aperture dimensioned to receive a retainer screw for retaining said lever shaft in mating relation to said bell crank shaft within said at least one bearing assembly disposed within said bearing housing.

6. The pitch changer system of claim 1, wherein said adjustment member of said lever assembly includes a thumb wheel dimensioned to extend at least partially through said adjustment member aperture in said mounting plate so a user may manually adjust said rotational range of said lever from said upper surface of said mounting plate.

7. The pitch changer system of claim 1, wherein said adjustment member of said lever assembly includes a shaft extending from a thumb wheel dimensioned to engage with an adjustment block having a tuning stop.

8. The pitch changer system of claim 7, wherein said shaft of said adjustment member of said lever assembly includes a threaded section and an unthreaded section, said threaded section is dimensioned to be threadably received with a threaded aperture in said adjustment block, and said unthreaded section is dimensioned to engage with a set screw that is used to selectively apply friction to said adjustment member.

9. The pitch changer system of claim 1, wherein the rotation adjustment assembly of said lever assembly includes a fixed tuning stop and a movable tuning stop that collectively define the rotational range of said lever.

10. The pitch changer system of claim 9, wherein the fixed tuning stop of the rotation adjustment assembly of said lever assembly is positioned in a fixed location relative to said bearing housing and the movable tuning stop is positioned on a translating section forming part of the rotation adjustment assembly.

11. The pitch changer system of claim 2, wherein said bell crank of said lever assembly includes a plurality of mounting apertures dimensioned to be coupled to the lever tensioning system and thereby select a predetermined throw of said lever during use.

12. The pitch changer system of claim 1, wherein said bearing housing is: a) machined as an integral structural part of the mounting plate; or b) at least one of glued, welded, bolted or otherwise securely mounted to the lower surface of the mounting plate.

13. The pitch changer system of claim 1, further comprising a swing-plate assembly configured to cooperate with said lever tensioning system.

14. A pitch changer system for a stringed musical instrument having a body, a neck, and a saddle mounting plate attached to the body, the pitch changer system comprising:

a lever assembly configured to be mounted to said body of said stringed musical instrument, said lever assembly including a lever rotatably coupled to a mounting plate;

a reversable saddle assembly configured to be mounted to a saddle mounting plate, said reversable saddle assembly including:

a saddle block including a static saddle and a hinge block, said saddle block being at least one of height adjustable and longitudinally adjustable relative to said saddle mounting plate, wherein said static saddle is dimensioned to have a first string of said instrument extending thereover during use; and a rotating saddle configured to be hingedly coupled to said hinge block, said rotating saddle including a string aperture dimensioned to receive a second string of said instrument, wherein said rotating saddle may be selectively reversed relative to said hinge block such that said saddle block may be reversed to thereby use said static saddle for said second string of said instrument and said rotating saddle for said first string of said instrument; and a lever tensioning system configured to be mounted to said body of said stringed musical instrument, wherein applying force to move said lever in a first direction forces said rotating saddle into rotation to elongate and thereby temporarily change the pitch of a string coupled to the rotating saddle.

15. The pitch changer system of claim 14, further comprising a swing-plate assembly configured to extend into a swing plate recess formed in the body of the stringed musical instrument, said swing plate assembly including a recess configured to receive said third region of said lever tensioning system.

16. The pitch changer system of claim 14, wherein said hinge block includes a first pair of apertures dimensioned to receive a hinge pin to maintain said rotating saddle in a first position relative to said hinge block, and a second pair of apertures dimensioned to received said hinge pin to maintain said rotating saddle in a second position relative to said hinge block.

17. The pitch changer system of claim 14, wherein said hinge block includes a recess for accessing a first side of said first and second pair of apertures to facilitate selectively removing said hinge pins to selectively reverse said rotating saddle relative to said hinge block.

18. The pitch changer system of claim 14, wherein a force of said first string extending over said static saddle helps create contact between a height adjustment screw of saddle block and said bridge mounting plate.

19. The pitch changer system of claim 14, wherein said saddle block is height adjustable via a first screw dimensioned to be received in a threaded aperture formed generally vertically in said static saddle relative to said saddle mounting plate and a second screw dimensioned to be received in a threaded aperture formed generally vertically in said hinge block relative to said saddle mounting plate.

20. The pitch changer system of claim 14, wherein said saddle block is longitudinally adjustable via a screw dimensioned to be received in a threaded aperture formed generally horizontally in said hinge block relative to said saddle mounting plate to simultaneously intonate said first and second strings of said instrument.

* * * * *